(12) United States Patent
Hudson et al.

(10) Patent No.: US 12,465,010 B2
(45) Date of Patent: Nov. 11, 2025

(54) MILKING CLUSTER PIPE SUPPORT

(71) Applicant: JH & PM SOLUTIONS LTD, Leyburn (GB)

(72) Inventors: James Hudson, Leyburn (GB); Andrew Metcalfe, Leyburn (GB)

(73) Assignee: JH Solutions Limited., Leyburn (GB)

( * ) Notice: Subject to any disclaimer, the term of this patent is extended or adjusted under 35 U.S.C. 154(b) by 0 days.

(21) Appl. No.: 18/563,526

(22) PCT Filed: May 24, 2022

(86) PCT No.: PCT/GB2022/051302
§ 371 (c)(1),
(2) Date: Nov. 22, 2023

(87) PCT Pub. No.: WO2022/248847
PCT Pub. Date: Dec. 1, 2022

(65) Prior Publication Data
US 2024/0245030 A1     Jul. 25, 2024

(30) Foreign Application Priority Data
May 25, 2021 (GB) ..................................... 2107448

(51) Int. Cl.
*A01J 7/00*     (2006.01)
*A01J 5/00*     (2006.01)
(Continued)

(52) U.S. Cl.
CPC ............... *A01J 5/0175* (2013.01); *A01J 7/00* (2013.01); *F16L 3/02* (2013.01)

(58) Field of Classification Search
CPC .......... A01K 1/12; A01K 1/126; A01K 29/00; A01K 5/02; A01J 7/00; A01J 5/017
(Continued)

(56) References Cited

U.S. PATENT DOCUMENTS 2,039,758 A * 5/1936 Wayne ............... A47G 25/0685
                                                          211/100
2,602,621 A * 7/1952 Fasching ................. A01J 7/00
                                                          248/285.1
(Continued)

FOREIGN PATENT DOCUMENTS

WO     2010014811 A2     2/2010

OTHER PUBLICATIONS

International Search Report and Written Opinion received in PCT/GB2022/051302 mailed Aug. 19, 2022.
(Continued)

*Primary Examiner* — Joshua D Huson
*Assistant Examiner* — Spencer T Callaway
(74) *Attorney, Agent, or Firm* — Meunier Carlin & Curiman LLC

(57) ABSTRACT

A milking cluster pipe support (1) for fitment to the deckside (3) of a milking parlour comprising a pivotable elongate pipe support arm (5) having pipe slots (29) and which is moveable about a pivot (7) between a deployed and a stowed position within a plane P. The pipe support arm (5) is pivotable in a first rotational sense from its deployed position to its stowed position and in a second rotational sense from its stowed position to its deployed position, wherein the first and second rotational senses are opposite to each other. The pipe support arm (5) has a centre of gravity which is located on one side of the vertical axis Y-Y in the deployed position and on the other side of the vertical axis Y-Y in the stowed position.

21 Claims, 22 Drawing Sheets

(51) Int. Cl.
*A01J 5/017* (2006.01)
*A01J 5/04* (2006.01)
*F16L 3/00* (2006.01)
*F16L 3/01* (2006.01)
*F16L 3/02* (2006.01)
*F16L 3/20* (2006.01)

(58) Field of Classification Search
USPC .......... 119/14.1, 14.45; 248/75–88, 68.1, 70, 248/291.1
See application file for complete search history.

(56) References Cited

U.S. PATENT DOCUMENTS

| | | | | |
|---|---|---|---|---|
| 5,150,866 A | * | 9/1992 | Karpisek | B65B 39/00 248/585 |
| 5,941,497 A | * | 8/1999 | Inoue | H01Q 1/125 248/514 |
| 6,289,845 B1 | * | 9/2001 | Andersson | A01J 5/017 119/14.08 |
| 7,124,755 B2 | * | 10/2006 | Van Hooser | F16M 11/2021 128/205.13 |
| 8,132,530 B2 | | 3/2012 | Petterson | |
| 2010/0024734 A1 | * | 2/2010 | Gingrich | A01J 7/00 119/14.02 |
| 2013/0068166 A1 | | 3/2013 | Ahlem | |

OTHER PUBLICATIONS

Combined Search and Examination Report received in GB2107448. 9, dated Nov. 12, 2021.
DairySmarter, May 2011, video of "Rotary Slender Hose Tree," available at https://www.youtube.com/watch?v=hvbEJfnuRk0.

* cited by examiner

MILKING CLUSTER PIPE SUPPORT

The present invention relates to a milking cluster pipe support for use with animal milking equipment, both milking equipment provided on a small scale, for example on a single milking stand for milking a small number of animals, and milking equipment provided on a large scale, for example in a milking parlour. The present invention is particularly suitable for use in a rotary, a herringbone or a rapid exit milking parlour for dairy cows. However, it is also suitable for use with other animals, for example sheep, goats, bison, camels and buffalo. In relation to milking equipment for milking dairy cows, a milking cluster comprises four cups for fitting to the four teats of a cow's udder. The four cups are connected to a milk pipe and to a pair of vacuum/atmospheric pressure pipes. The milk pipe transports milk from the cow to a milk tank and can apply a vacuum to each of the cups, so that each cup is held in place on one of the teats of the udder. The pair of vacuum/atmospheric pressure pipes alternatively connects the cups to a vacuum and then to atmospheric pressure, in order to simulate the way that a calf would extract milk from a cow. In order to maximise the amount of milk obtained from each cow it is important to hold the milking cluster in the correct position for the particular cow that is being milked. It is important that the milking cluster is held at the correct height above the deck of a milking parlour, in the correct lateral position within the stall and at the correct distance away from the deck-side of kerb. The milking cluster can be held in the correct position by using a milking cluster pipe support to support the three pipes whilst the milking cluster is attached to the cow's udder. When the milking cluster is not attached to the cow's udder it is important that the milking cluster pipe support does not create an obstacle to the efficient working of the parlour. For example, in some rotary (and circular) parlour arrangements a cow will walk forwards into a stall, so that it is facing towards the centre of the circle and then, once milking has been completed, it will back out of the stall. Any object that is in the way when the cow is backing out will impede the cow's movement and may, if the cow becomes upset, cause injury to the cow. In all milking parlour designs, for example irrespective of whether the parlour is a rotary parlour, a herringbone parlour, or a rapid exit parlour, the milking cluster pipe support should not get in the way when a milker (e.g. a human assisting the milking process) is trying to attach the milking cluster to the udder of a cow. If a small cow is in the stall, then the udder of that cow may be located further into the stall, causing the milker to have to lean inwards to attach the milking cluster. If the milking cluster pipe support is in the way then it may be very difficult, or impossible, for the milker to attach the milking cluster. It is also advantageous to only have the milking cluster pipe support in an exposed position for a minimum amount of time so that the risk of it being broken by a cow kicking out and consequent injury to the cow or a milker from pieces of broken milking cluster pipe support is minimised. Furthermore, it is important that the milking cluster pipes can be easily placed into the support soon after the milking cluster is attached to the udder and can be easily removed from the support soon after the milking cluster is removed from the udder (once milking is complete). In addition, it is desirable to keep the milking clusters from falling on to the floor of the milking parlour where they may become dirty and then need to be cleaned. A milking cluster for cows needs to have four cups, however milking clusters with two cups can be provided for animals with only two teats, such as sheep and goats.

Prior art devices for supporting milking cluster pipes are known for use in milking parlours in which the milking clusters are removed manually and milking parlours in which the milking clusters are removed automatically, e.g. using a milking cluster retraction system. However, all of the known devices have disadvantages which mean that they do not provide the optimum solution for highly reliable operation, increased milking efficiency and improved animal welfare. The present invention provides a device which is highly reliable in use, particularly with automatic milking cluster retraction systems, which reduces the input required from the personnel milking the cows, which improves the positioning of the milking cluster relative to the udder of a cow and which is stowed out of the way of animal movements.

Accordingly the present invention provides a milking cluster pipe support, for fitment to the deck-side or kerb of a milking parlour, comprising a pivotable pipe support arm that moves within a plane P between a deployed position and a stowed position, wherein the extent of movement of the pipe support arm between the deployed position and the stowed position is constrained by a deployed position end stop and by a stowed position end stop and in the deployed position the pipe support arm rests against the deployed position end stop and in the stowed position the pipe support arm rests against the stowed position end stop, the pipe support arm having towards one end at least one open ended pipe slot and having towards another end a pivot point, wherein the milking cluster pipe support has a pivot extending perpendicularly to the plane P and having a horizontal axis X-X and a vertical axis Y-Y located within the plane P and passing through the centre of the pivot, wherein the pipe support arm pivots freely around the pivot within the plane P and moves in a first rotational sense from its deployed position to its stowed position and in a second rotational sense from its stowed position to its deployed position, wherein the first rotational sense and the second rotational sense are opposite to each other, wherein when the pipe support arm is located in the deployed position its centre of gravity is located on one side of the vertical axis Y-Y and the pipe support arm is held against the deployed position end stop under the action of gravity and when the pipe support arm is located in the stowed position its centre of gravity is located on the other side of the vertical axis Y-Y and the pipe support arm is held against the stowed position end stop under the action of gravity. The advantage of having a pipe support arm that pivots freely is that it facilitates movement of the pipe support arm from the deployed position to the stowed position under the action of gravity, once the centre of gravity of the pipe support arm has been rotated past the vertical axis Y-Y. This avoids the need for the milker to manually move the pipe support arm, or for the pipe support arm to be moved by some mechanical means.

A milking parlour has a generally horizontal deck upon which the cows walk and stand when being milked. In the case of a rotary parlour the deck is circular and around the circumference of the deck is provided a deck-side or kerb that curves around the circular deck. That deck-side or kerb might be a vertical surface that extends downwardly from the deck, and/or the deck-side or kerb might be fitted with a bar or with a rail. Non-rotary parlours typically have straight edges to the deck and thus the deck-side or kerb would be straight and the deck-side or kerb might be a flat vertical surface that extends downwardly from the deck, and/or the deck-side or kerb might be fitted with a bar or with a rail. The present invention is suitable for fitment to any configuration of deck-side or kerb of a milking parlour.

In a preferred embodiment of the present invention, if the deck-side or kerb is vertical, then the milking pipe cluster support can be fixed directly to the deck-side or kerb, or if the deck-side or kerb is not vertical and/or the deck-side or kerb is provided with a bar or with a rail then a mounting plate can be fitted to the deck-side or kerb, or to the rail or bar to provide a vertical surface to which the milking pipe cluster support can be fitted.

Preferably, in use, when the pipe support arm is in the deployed position the at least one open ended pipe slot is located above the level of the top of the deck-side or kerb to which the milking cluster pipe support is fitted and when, in use, the pipe support arm is in the stowed position the at least one open ended pipe slot is located below the level of the top of the deck-side or kerb to which the milking cluster pipe support is fitted.

Preferably, the deployed position end stop is located on the plane P and the stowed position end stop is located on the plane P.

Preferably, the deployed position end stop is located on the same side of the vertical axis Y-Y as the centre of gravity of the pipe support arm when the pipe support arm is in the deployed position, and wherein the stowed position end stop is located on the same side of the vertical axis Y-Y as the centre of gravity of the pipe support arm when the pipe support arm is in the stowed position.

Preferably, the pivot, the deployed position end stop and the stowed position end stop are provided on a pivot bracket.

Preferably, the pipe support arm and the pivot bracket are reversible and in a first orientation the first rotational sense is clockwise and in a second orientation the first rotational sense is anti-clockwise.

Preferably, when the pipe support arm is in the stowed position the at least one pipe slot is located below the horizontal axis X-X.

Preferably, the pipe support arm comprises a spine from which extends the at least one pipe slot, the spine having a longitudinal axis L-L which is oriented vertically when the pipe support arm is in the deployed position and the at least one pipe slot being directed upwards at an acute angle $\Theta$ relative to the longitudinal axis L-L.

Preferably, the acute angle $\Theta$ is 43 degrees. However, the angle $\Theta$ can be smaller or larger dependent upon factors such as the type of milking stand or parlour, the type of milking cluster and/or milking cluster pipes and the geometry required to release the milking cluster pipes from the pipe support arm at the desired time if the pipe support arm is to be used as part of an automated retraction system.

Preferably, the at least one pipe slot has a mouth located at its open end and a base at its other end and wherein the mouth is located in the direction of the second rotational sense relative to the base. This arrangement is particularly advantageous in milking parlours using automatic milking cluster retraction systems. Upon retraction being commenced a retraction cord of the retraction system can act upon the pipe support arm directly, or via the milking cluster pipes and cause the pipe support arm to fall away from the milking cluster, from the milking cluster pipes and from the retraction cord, such that both the pipe support arm and the milking cluster return to their stowed position, facilitating the exit of the cow from the stall and readying the stall for entry of the next cow to be milked.

Preferably, the pipe support arm comprises a counterweight section that is located on the same side of the vertical axis Y-Y as the deployed position end stop when the pipe support arm is located in the deployed position and is located on the other side of the vertical axis Y-Y when the pipe support arm is located in the stowed position.

Preferably, the pipe support arm further comprises a slotted body and a pivot extension that are each attached to the counterweight section, the slotted body has a spine with a longitudinal axis L-L that is vertically oriented when the pipe support arm is in the vertical position and the pivot extension is offset from the axis L-L by an angle $\alpha$ in the second rotational sense.

Preferably, the angle $\alpha$ is 15 degrees. However, the angle $\alpha$ can be smaller or larger dependent upon the geometry that is required to produce the desired position of the centre of gravity of the pipe support arm.

Preferably, the milking cluster pipe support has three pipe slots and each pipe slot is provided between a pair of fingers extending from the spine of the pipe support arm.

Preferably, the pivot comprises a pivot hole in the pipe support arm located at the pivot point and a pivot pin, wherein the pivot hole is in the form of a pivot bore and wherein the internal diameter of the bore has a diameter larger than a clearance diameter relative to the external diameter of the pivot pin, such that movement of the pipe support arm outside of the plane P is facilitated.

Preferably, the stowed position end stop is rotationally offset around the pivot from the axis Y-Y in the first rotational sense by an angle $\beta_1$, $\beta_2$ of 105 degrees. Alternatively, the angle $\beta_1$, $\beta_2$ can be smaller or larger dependent upon factors such as the configuration of the milking stand or milking parlour.

Preferably, the deployed position end stop is rotationally offset around the pivot from the axis Y-Y in the second rotational sense by an angle $\alpha,\mu$ of 15 degrees. Alternatively, the angle $\alpha$, $\mu$ can be smaller or larger dependent upon factors such as the configuration of the milking stand or milking parlour.

Preferably, the pipe support arm has a front face and a back face through each of which the at least one pipe slot passes, wherein the pivot is located perpendicularly to the front face and to the back face and the front face and the back face are parallel to the plane P.

Alternatively, the pipe support arm may have a front face and a back face through each of which the at least one pipe slot passes, wherein the front face and the back face are located at an angle to the plane P.

As a further alternative, the pipe support arm may have a front face and a back face through each of which the at least one pipe slot passes, wherein at least a portion of the front face and the back face are located at an angle to the plane P.

Preferably, the milking cluster pipe support further comprises a mounting plate to which the pivot is attached, wherein the mounting plate has a vertically orientated attachment surface and the mounting plate is attachable to the deck-side. This is advantageous because it permits use of the milking cluster pipe support of the present invention on parlours without vertical deck-sides.

Preferably, the mounting plate is slideably attachable to the deck-side. This is advantageous because it allows the milking cluster pipe support of the present invention to be placed in a location for optimal positioning of the milking cluster if the cow should not be stood centrally within the stall.

According to a second aspect of the present invention there is provided a milking parlour comprising a deck-side or a kerb to which is fitted a milking cluster pipe support according to any one of the preceding claims.

The present invention will be described below, with reference to the following figures.

Figure 21:
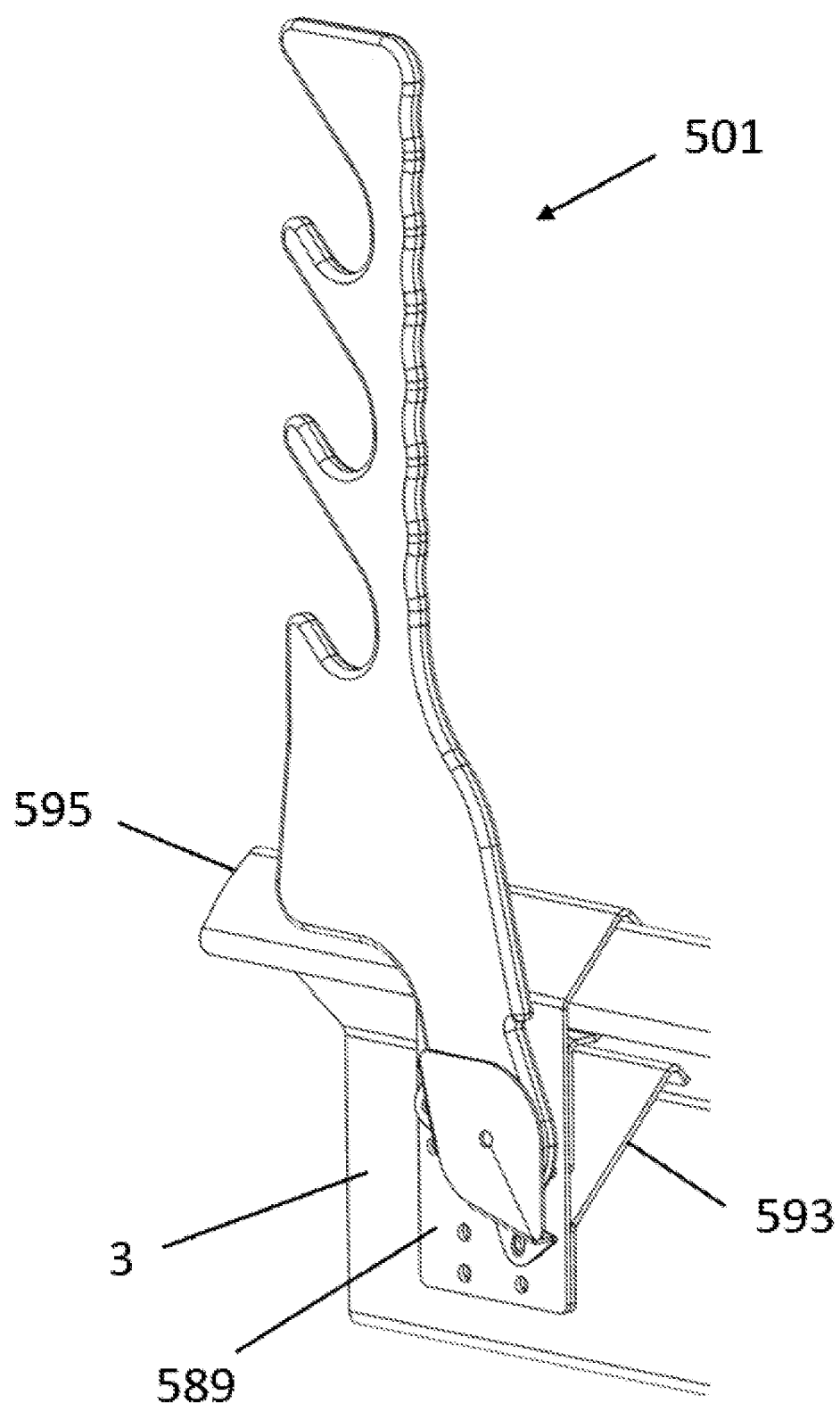
Figure 22:
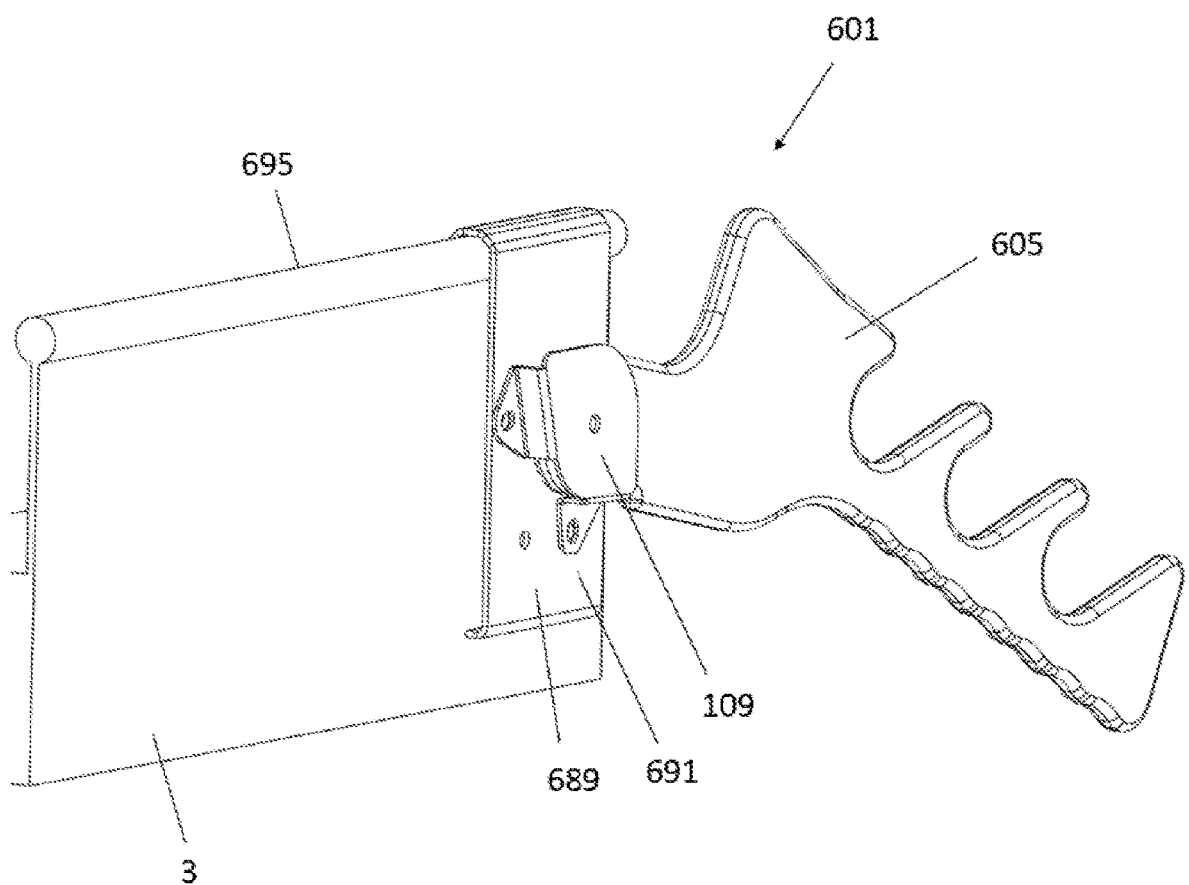

FIG. 21 is a perspective elevation view of an anti-clockwise milking cluster pipe support according to a fifth embodiment of the present invention with a mounting plate for attaching the milking cluster pipe support to the deck-side or kerb of a herringbone milking parlour or to the deck-side or kerb of a rapid exit parlour; and FIG. 22 is a perspective elevation view of an anti-clockwise milking cluster pipe support according to a fourth embodiment of the present invention with a mounting plate for attaching the milking cluster pipe support to the deck-side or kerb of a second type of rapid exit milking parlour.

Figure 1:
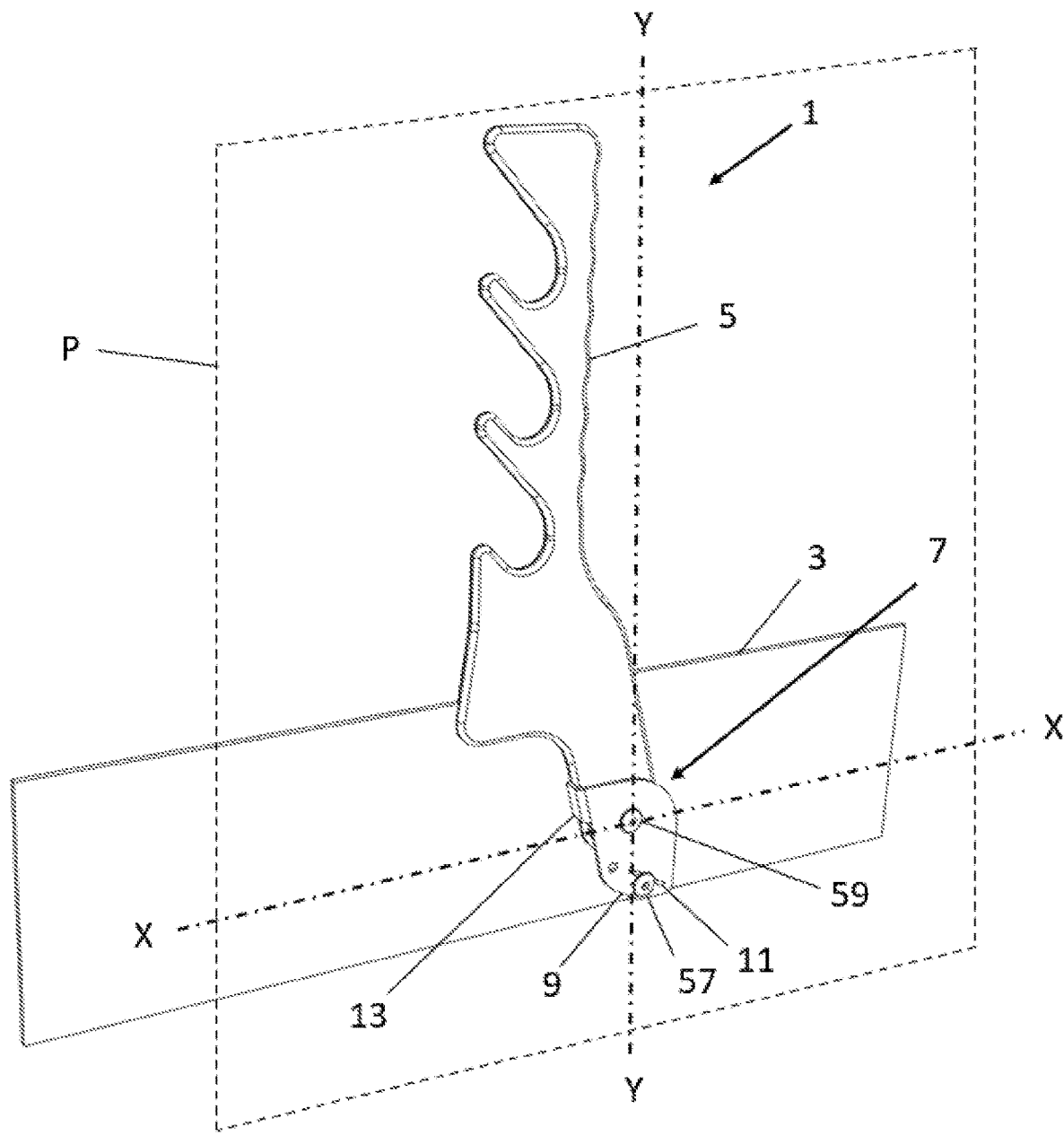
FIG. 1 is a perspective front view of an anti-clockwise milking cluster pipe support according to an embodiment of the present invention fixed to the deck of a milking parlour and with the pipe support arm in a deployed position (the support arm rotates in an anti-clockwise direction when moving from the stowed to the deployed position)
Figure 2:
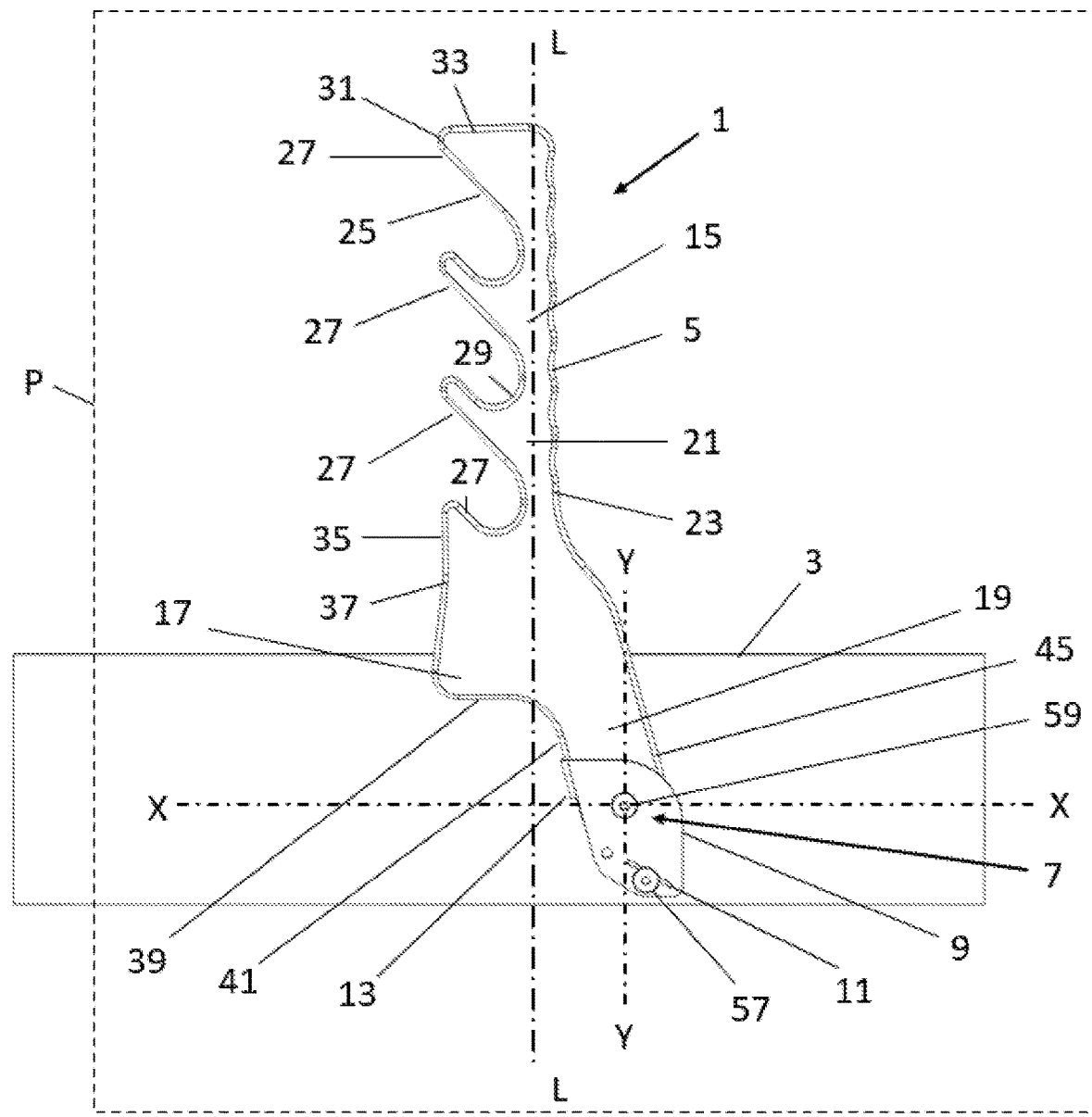
FIG. 2 is a front elevation view of the milking cluster pipe support of FIG. 1.
Figure 3:
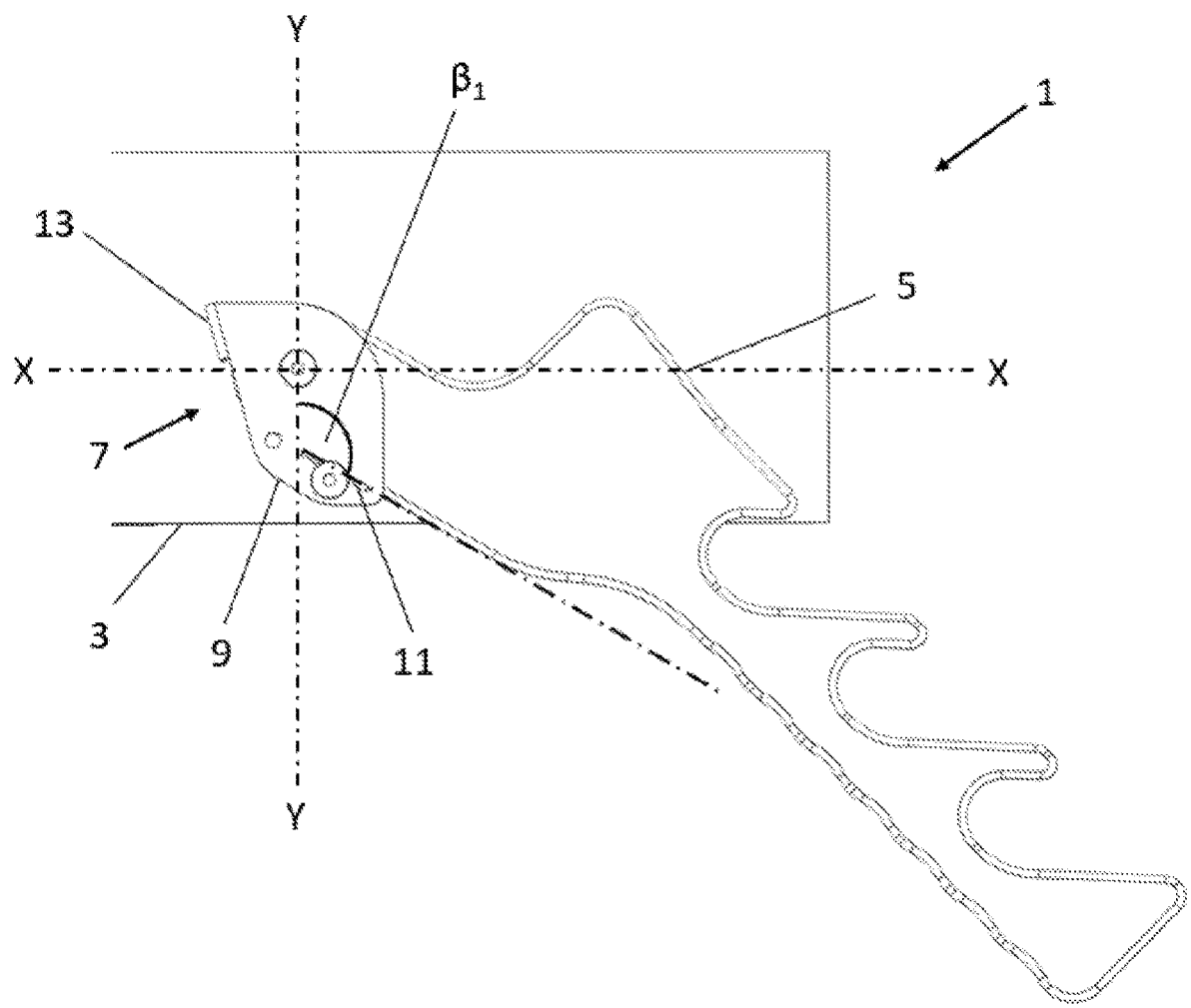
FIG. 3 is a perspective front view of the milking cluster pipe support of FIG. 1 with the pipe support arm in a stowed position.

An anti-clockwise milking cluster pipe support 1 according to the present invention is shown in FIGS. 1 and 2 fixed to the deck-side 3 or kerb 3 of a rotary milking parlour (not shown) and in a deployed position. The pipe support 1 is denoted as an anti-clockwise variant because it rotates in an anti-clockwise direction when being moved from a stowed position to a deployed position. The pipe support 1 comprises a rotating pipe support arm 5 which rotates about a pivot 7 attached to the deck side 3. A pivot bracket 9 supports one end of the pivot 7 and provides a stowed position end stop 11 and a deployed position end stop 13 against which the pipe support arm 5 can rest when in use. FIGS. 1 and 2 illustrate the pipe support arm 5 when it is in the deployed position and resting against the deployed position end stop 13. FIG. 3 illustrates the pipe support arm 5 when it is in the stowed position and resting against the stowed position end stop 11.

The pipe support arm 5 is elongate and planar and made from a high strength polymer sheet material that is rigid and impact resistant. It has a height H of 560 mm. The thickness of the pipe support arm 5, (perpendicular to its planar surface) is relatively low, typically 10 mm. The pipe support arm 5 has an upper end section (when the pipe support arm 5 is in the deployed position) which comprises a slotted body 15, an intermediate section that provides a counterweight section 17 and a lower end section that provides a pivot extension 19, all of which three sections are integrated so that the pipe support arm 5 is formed as a unitary member. The pipe support arm 5 has a longitudinal axis L-L which is vertical when the pipe support arm 5 is in its deployed position.

Figure 4:
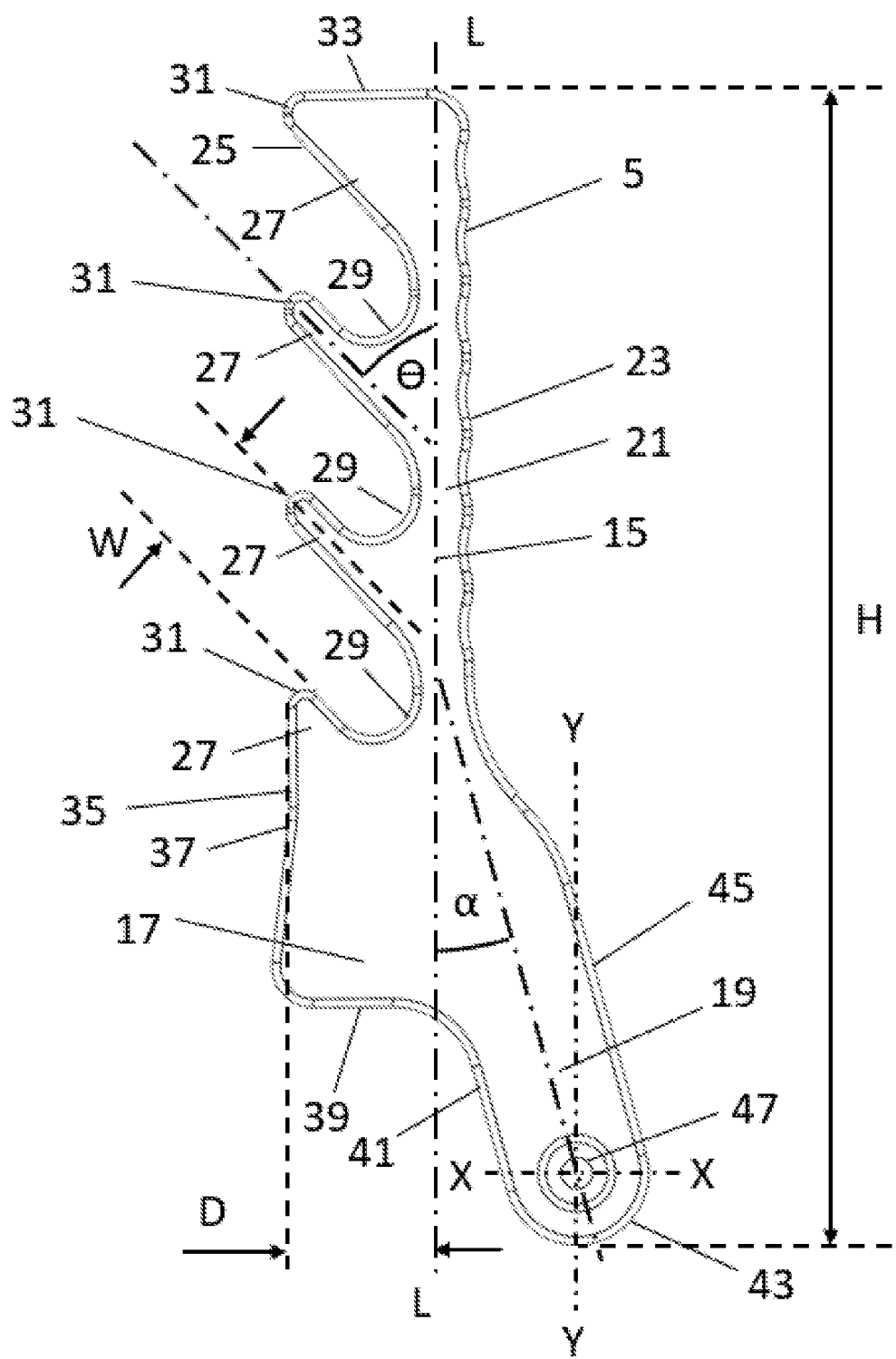
FIG. 4 is a perspective front view of the pipe support arm of the milking cluster pipe support of FIG. 1 in a deployed position.

The slotted body 15 has a straight spine 21 that runs parallel to the axis L-L and on either side of it. The right hand edge 23 of the spine 21 (when viewed from the front, as shown in FIGS. 2 and 4, for example) is also the right hand edge 23 of the slotted body 15, forms part of the perimeter of the pipe support arm 5, is also generally parallel to the axis L-L and has a wave form (alternatively, the right hand edge 23 could be straight). The left hand edge 25 of the spine 21 is provided with four elongate fingers 27 that extend outwardly from the spine 21 in an upwards direction at an angle (Θ) of 43 degrees to the axis L-L (as shown in FIG. 4). The fingers 27 are equally spaced apart from each other and a pipe slot 29 is created between each pair of fingers with a width (W) of 48 mm. The four fingers 27 thus create three pipe slots 29. The fingers 27 extend outwardly from the spine 21 so that their tips 31 are each perpendicularly equidistant from the axis L-L by a distance (D) of 70 mm (as shown in FIG. 4). The tips 31 of the fingers 27 and the edges of the pipe slots 29 create between them another part of the perimeter of the pipe support arm 5. The top of the spine 21 is provided with a flat top edge 33 that is perpendicular to the axis L-L and that joins up with the right hand edge 23 and the left hand edge 25 to form a continuous section of the perimeter of the pipe support arm 5.

The counterweight section 17 merges at its right hand extremity into the spine 21 and merges at its uppermost extremity into the lowermost of the fingers 27. The left hand edge 35 of the counterweight section 17 forms part of the perimeter of the pipe support arm 5. The upper section of the left hand edge 35 is parallel to axis L-L and it is provided with a kink 37 around its mid-point such that the lower part of the left hand edge 35 angles to the left, away from the axis L-L. The bottom edge 39 of the counterweight section 17 is generally perpendicular to the axis L-L, extends towards the axis L-L and when it is proximal to the axis L-L it joins with the left hand edge 41 of the pivot extension 19.

The pivot extension 19 is generally rectangular in shape and at its upper extremity it merges into the counterweight section 17 and into the spine 21. Its left hand edge 41 adjoins the bottom edge 39 of the counterweight section 17, it has a lowermost edge 43 that is hemispherical and joins its left hand edge 41 to its right hand edge 45, and its right hand edge joins to the right hand edge 23 of the slotted body 15, thus providing the final part of the perimeter of the pipe support arm 5. The pivot extension 19 is cranked away from the axis L-L by an angle ($\alpha$) of 15 degrees (as shown in FIG. 4). At the centre point of the circle that forms the hemispherical lowermost edge 43, the pivot extension 19 is provided with a circular pivot bore 47.

Figure 5:
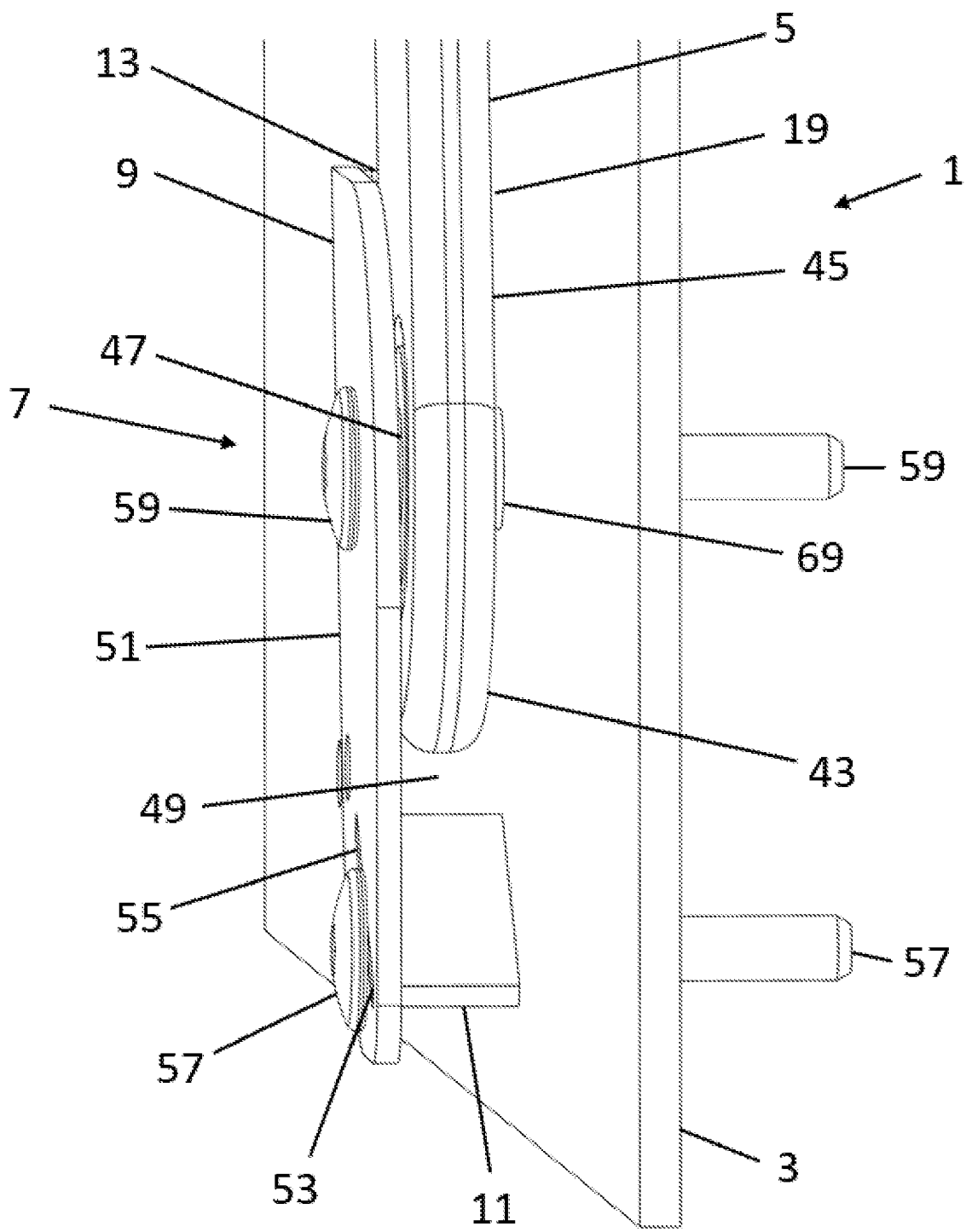
FIG. 5 is a perspective side view of the inside of the pivot bracket of the milking cluster pipe support of FIG. 1.
Figure 6:
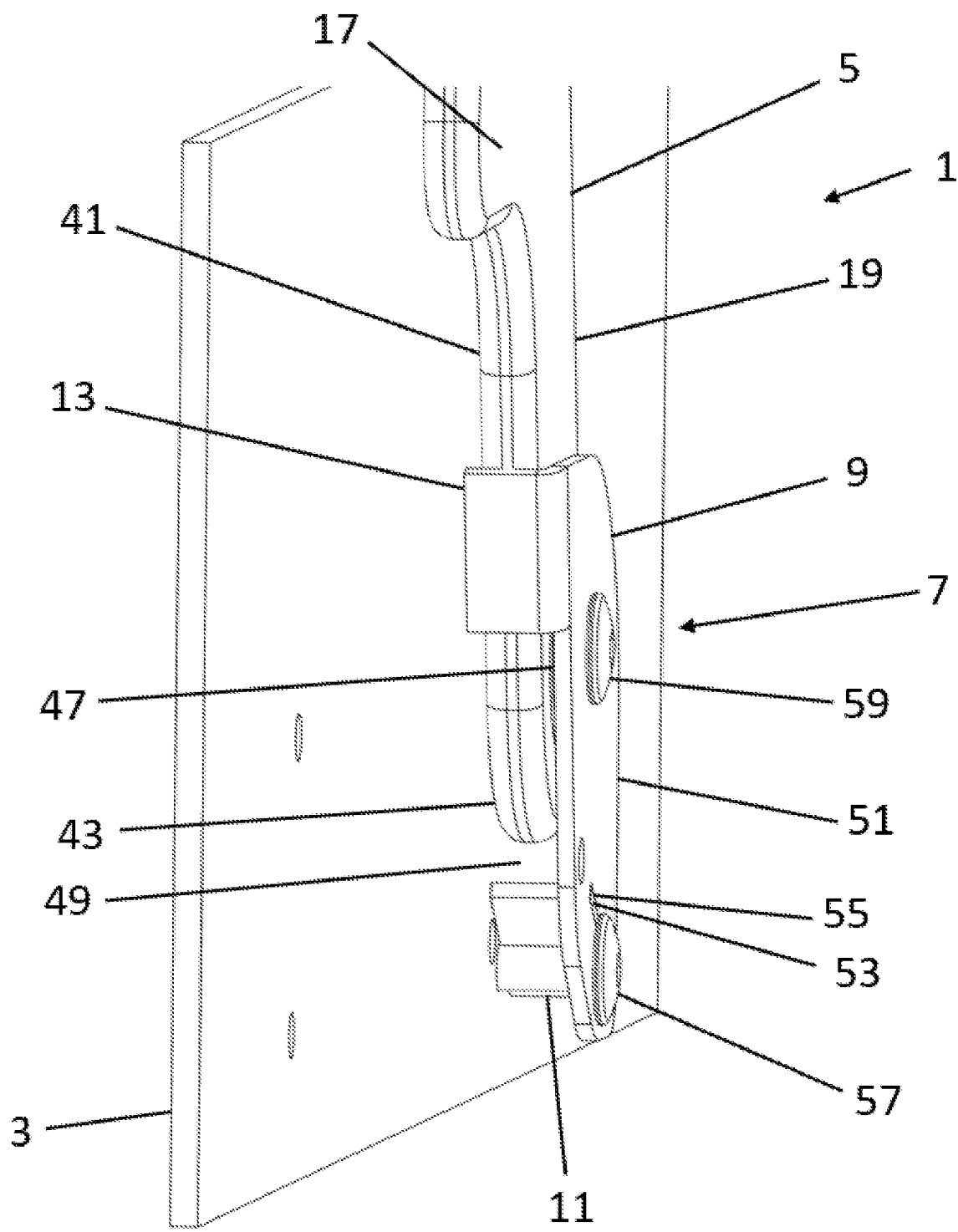
FIG. 6 is a perspective side view of the outside of the pivot bracket of the milking cluster pipe support of FIG. 1.
Figure 7:
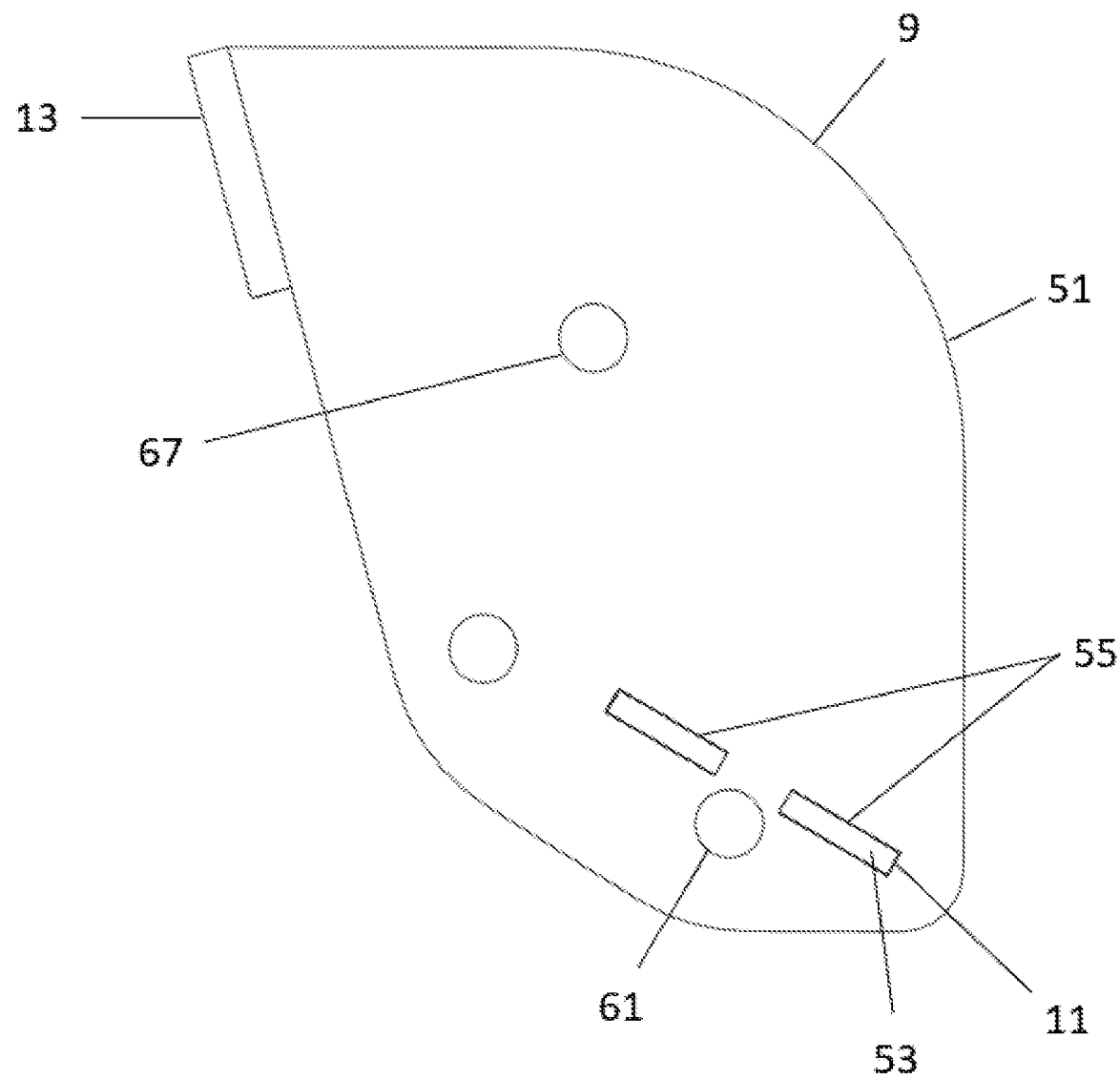
FIG. 7 is a front elevation view of the pivot bracket of the milking cluster pipe support of FIG. 1.

FIGS. 5 and 6 are internal and external views of the pivot bracket 9 showing the arrangement of the pipe support arm 5 and the pivot 7. The pivot bracket 9 provides an arm pocket 49 within which the pivot extension 19 of the pipe support arm 5 is located. One side of the arm pocket 49 is provided by a fixings plate 51, the other side is provided by the deck-side 3 and the two sides are kept apart by the stowed position end stop 11 and the deployed position end stop 13. The deployed position end stop 13 is formed integrally with the fixings plate 51 and is arranged perpendicularly to it. The stowed position end stop 11 is formed separately to the fixings plate 51, is rectangular in shape and is provided with a tab 53 that is located within a tab slot 55 on the fixings plate 51. The fixings plate 51 is clamped against the deck side 3 by a threaded bottom bolt 57 and a threaded pivot bolt 59. The bottom bolt 57 passes through a first bottom bolt hole 61 (as shown in FIG. 7), provided in the fixings plate 51 adjacent to the stowed position end stop 11, through a second bottom bolt hole 63 provided in the deck side 3 and then engages with a threaded bottom nut 65 (not shown) that is adjacent to the back face of the deck side 3. The pivot bolt 59 passes through a first pivot bolt hole 67, provided in the fixings plate 51 between the stowed position end stop 11 and the deployed position end stop 13, through a cylindrical pivot bush 69 that is provided within the pivot bore 47 of the pipe support arm 5, through a second pivot bolt hole 71 provided in the deck side 3 and then engages with a threaded pivot nut 73 (not shown) that is adjacent to the back face of the deck side 3. The pivot bush 69 is a clearance fit over the pivot bolt 59, so that the pivot bush 69 and thus the pipe support arm 5 can pivot freely relative to the pivot bolt 59 and thus the bracket 9, for example so that the pipe support arm 5 can pivot under the action of gravity. The bottom bolt 57 and the pivot bolt 59 are tightened so that the stowed position end stop 11, the deployed position end stop 13 and the pivot bush 69 are held in contact with the deck-side 3. The pivot bush 69 is held against rotation by the clamping force and the pipe support arm 5 rotates around the pivot bush 69 because the internal diameter of the pivot bore 47 is slightly larger than the external diameter of the pivot bush 69.

Figure 8:
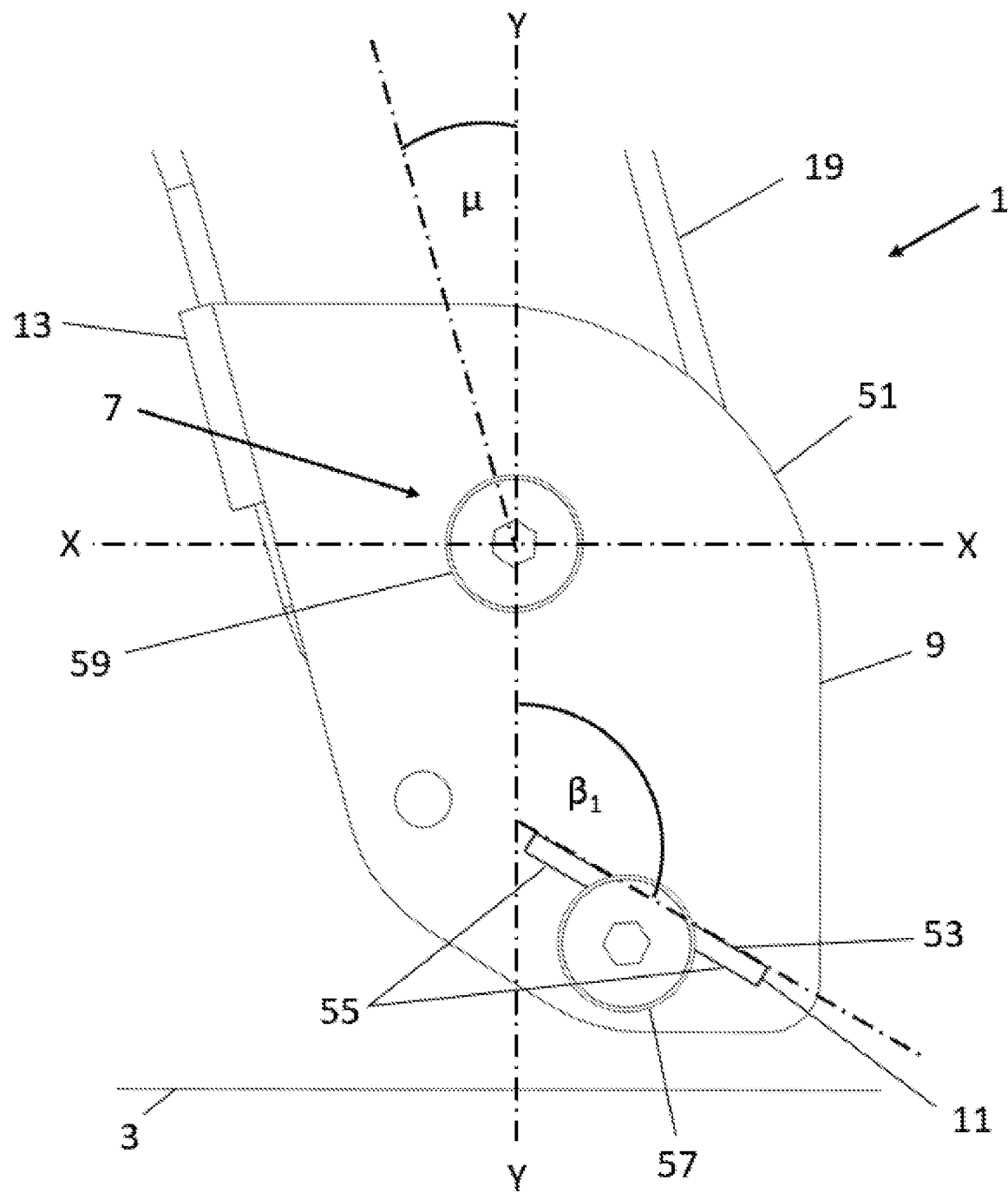
FIG. 8 is a front elevation view of the pivot bracket of the milking cluster pipe support of FIG. 1 and part of the pipe support arm.

FIG. 8 illustrates the angles at which the stowed position end stop 11 and the deployed position end stop 13 are oriented relative to the pivot 7 of the milking cluster pipe support 1. The stowed position angle ($\beta_1$) is 120 degrees from the vertical in a clockwise direction and the deployed position angle ($\mu$) is 15 degrees from the vertical in an anti-clockwise direction.

Figure 9:
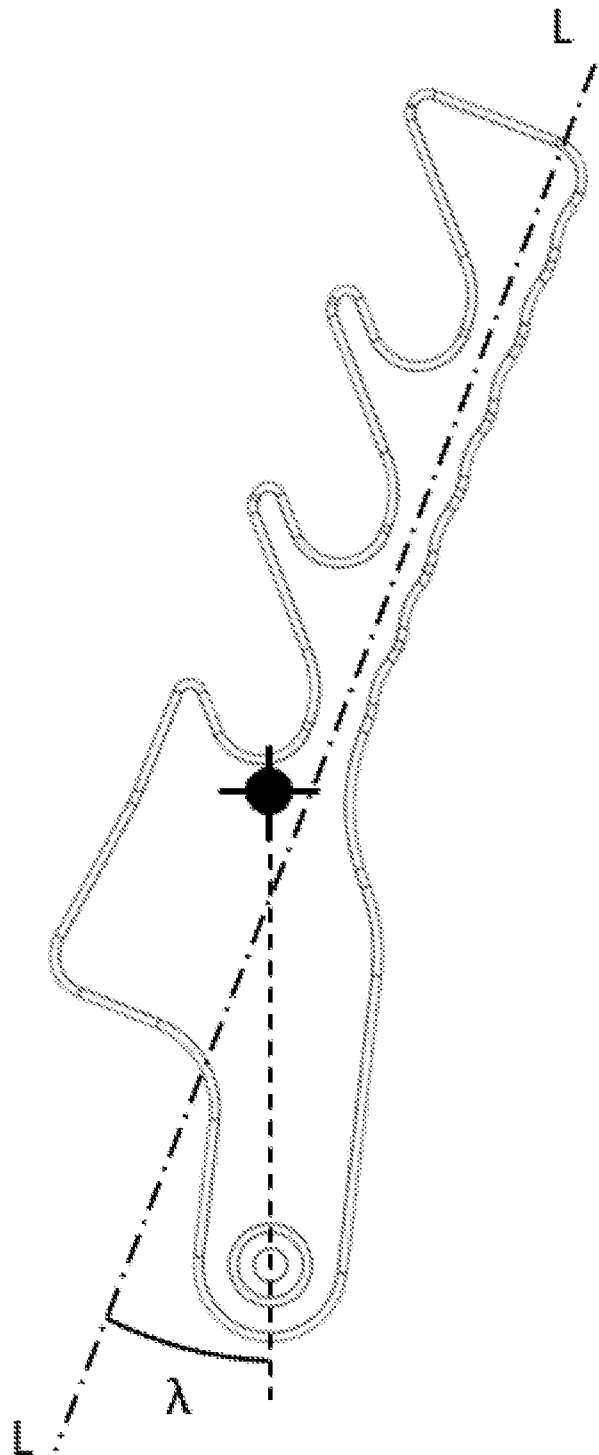
FIG. 9 is a front elevation view of the pipe support arm illustrating an inclination of the pipe support arm at which it is balanced and will not rotate clockwise or anti-clockwise under the action of gravity.

FIG. 9 is an illustration of the balance angle ($\lambda$) of 17 degrees at which the support arm 5 is inclined in a clockwise direction to reach its balance point at which it will not rotate either anti-clockwise, towards the deployed position end stop 13, or clockwise towards the stowed position end stop 11.

FIGS. 10, 11, 12 and 13 show the pipe support 1 of the present invention being used to support the milking cluster pipes 75 of a milking cluster 77 that is attached to a milking cluster retraction system 79 of a rotary milking parlour. The milking cluster 77 is manually attached to the teats of the udder of a cow to commence milking the cow and the milking cluster 77 is automatically removed from the udder using the retraction system 79 once milking has been completed. During milking the milking cluster 77 is held in place by a vacuum between each of the four milking cups 81 on the milking cluster 77 and each of the four teats on the udder. Once milking has been completed the vacuum is released and the cups 81 can be removed from the teats by pulling the milking cluster 77 away from the udder using a retraction line 83 of the retraction system 79. The rotary milking parlour of FIGS. 10, 11, 12 and 13 rotates in a direction from left to right in those figures or, viewed from above, in an anti-clockwise direction. The pipe support 1 of the present invention can also be utilised on a rotary milking parlour that rotates from right to left, or clockwise when viewed from above. This is because the way in which the support arm 5, the milking cluster pipes 75 and the retraction system 79 interact with each other stays the same, irrespective of the direction of rotation of the rotary parlour, or indeed irrespective of whether the parlour is a rotary parlour, a herringbone parlour or a rapid exit parlour.

Figure 10:
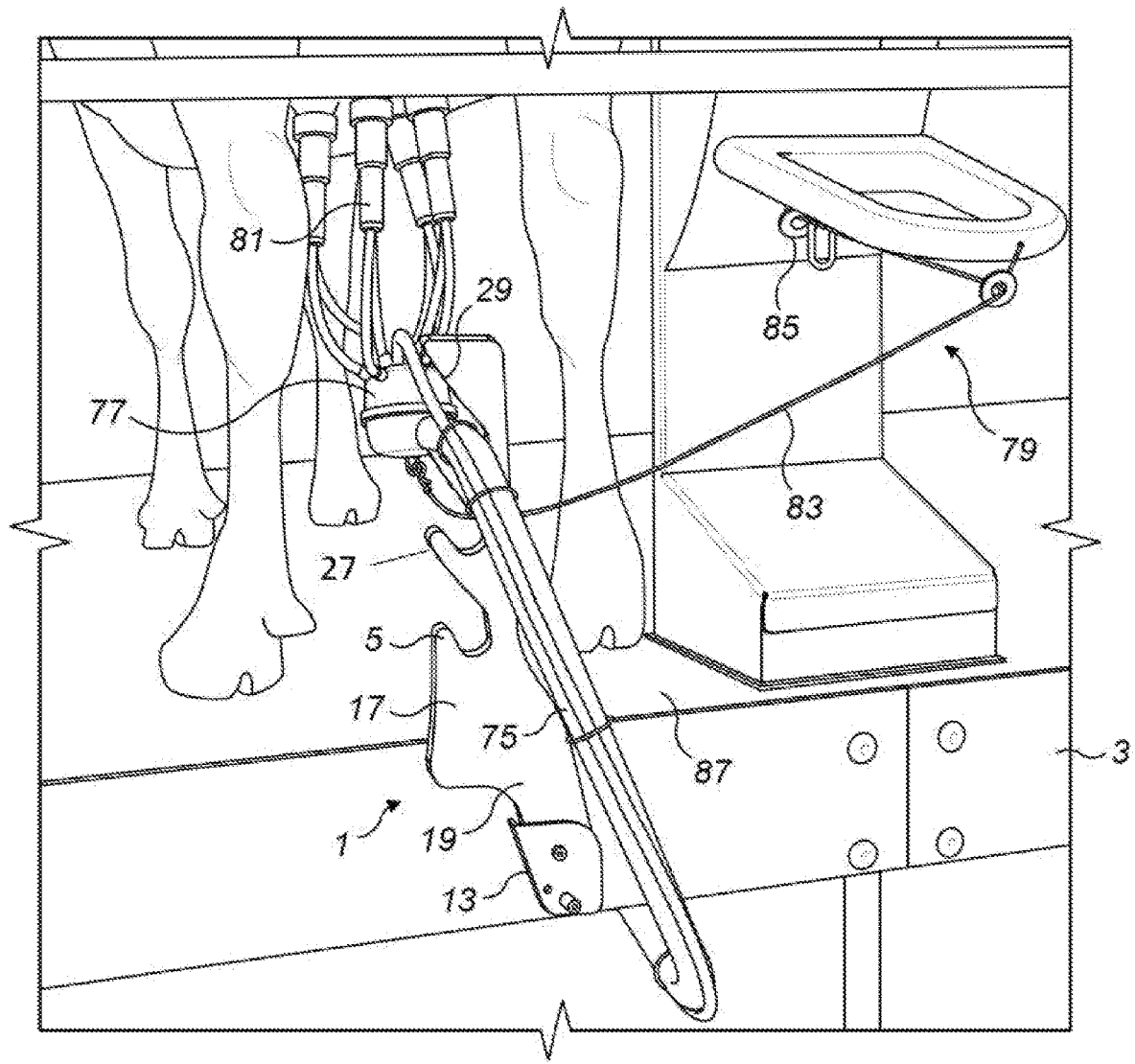
FIG. 10 is a perspective front view of a milking cluster pipe support with the pipe support arm located against the deployed position end stop whilst a cow is being milked.

FIG. 10 shows the position of the pipe support arm 5 whilst milking of a cow is taking place. The pipe support arm 5 is generally vertical and the pivot extension 19 is in abutment with the deployed position end stop 13 and is in the anti-clockwise configuration, i.e. the pipe support arm 5 rotates in an anti-clockwise direction when moving from its stowed position to its deployed position. The milking cluster pipes 75 are located in the uppermost pipe slot 29 and held in place by virtue of the pipe slot 29 being inclined upwardly and being bounded by fingers 27.

The milking cluster 77 is thus supported at the desired height for the cow being milked. The pipe support arm 5 is also able to distribute the weight of the milking cluster 77 and the weight of the milking cluster pipes 75 so that the downwards force applied to the front pair and rear pair of teats is optimised, for example the downwards force is evenly distributed between the front pair and rear pair of teats. The weighting of the pipe support arm 5 in an anti-clockwise direction towards the deployed position end stop 13, by the counterweight section 17, means it is stable in its deployed position and will not rotate clockwise back to the stowed position under the forces typically experienced during a milking cycle. Such forces might be imposed upon the pipe support arm 5 if a cow that is being milked moves to the right and drags the milking cluster pipes 75 to the right. FIG. 10 also shows the configuration of the retraction system 79. One end of the retraction line 83 is connected to the milking cluster 77 and the other end of the retraction line 83 is connected to a retraction mechanism 85 situated on the right hand side of a stall 87 within which the cow stands when it is being milked. In between its ends the retraction line 83 is passed around the pipe support arm 5 and locates within one of the pipe slots 29. The pipe support 1 of the present invention can also be utilised in a milking parlour where the retraction system 79 is located on the left hand side of the stall 87. If the retraction system 79 is located on the left hand side of the stall 87 and if the pipe support arm 5 moves in an anti-clockwise direction from its stowed position to its deployed position then the retraction line 83 is not passed around the pipe support arm 5. If the retraction system 79 is located on the left hand side of the stall 87 and if the pipe support arm 5 is arranged so that it moves in a clockwise direction from its stowed position to its deployed position then the retraction line 83 is passed around the pipe support arm 5.

Figure 11:
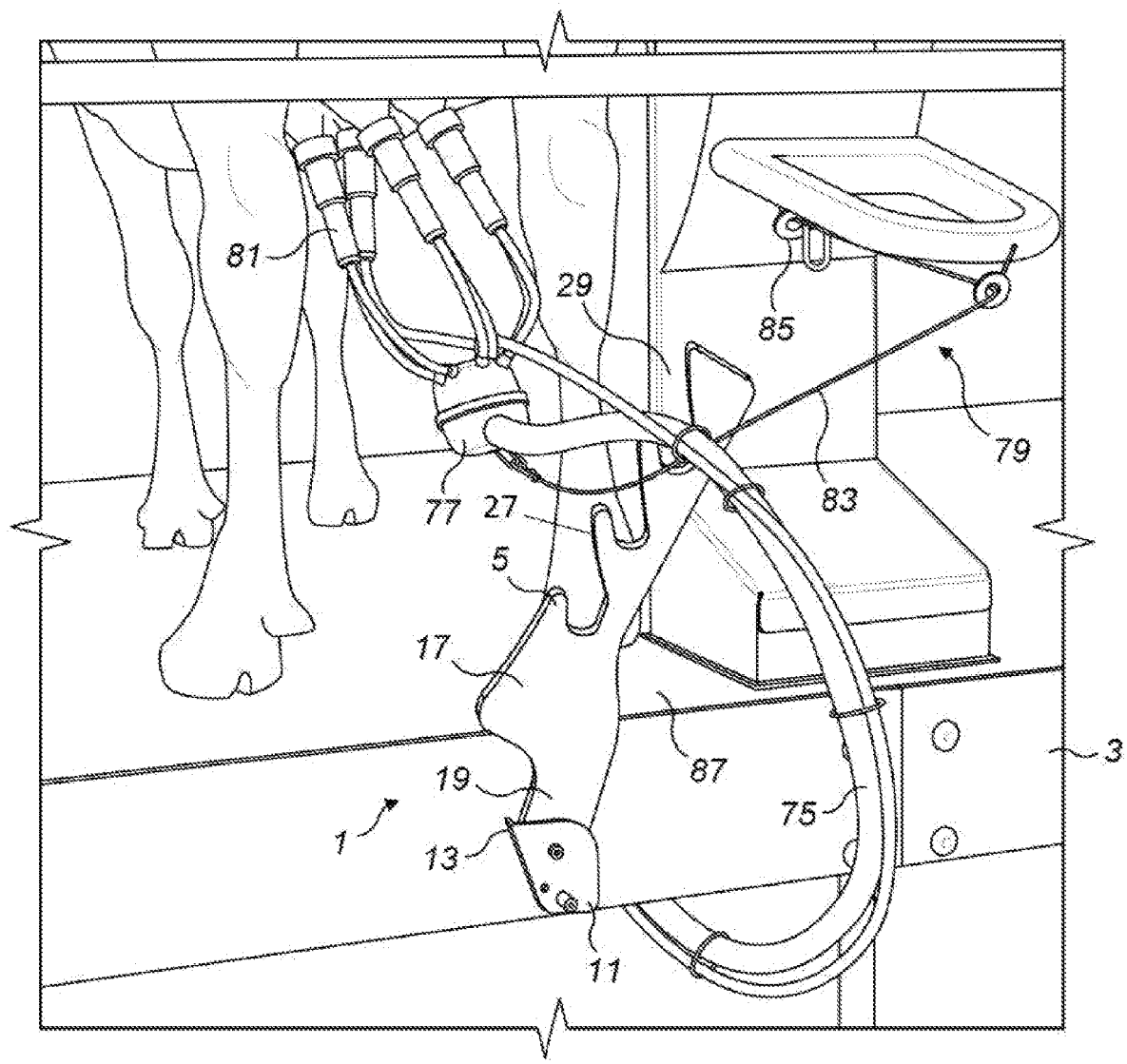
FIG. 11 is a perspective front view of a milking cluster pipe support after a cow has been milked, with the milking cluster being retracted, with the milking cluster pipes still located in a pipe slot and with the pipe support arm inclined at an angle to the vertical at which it will rotate clockwise under gravity.
Figure 12:
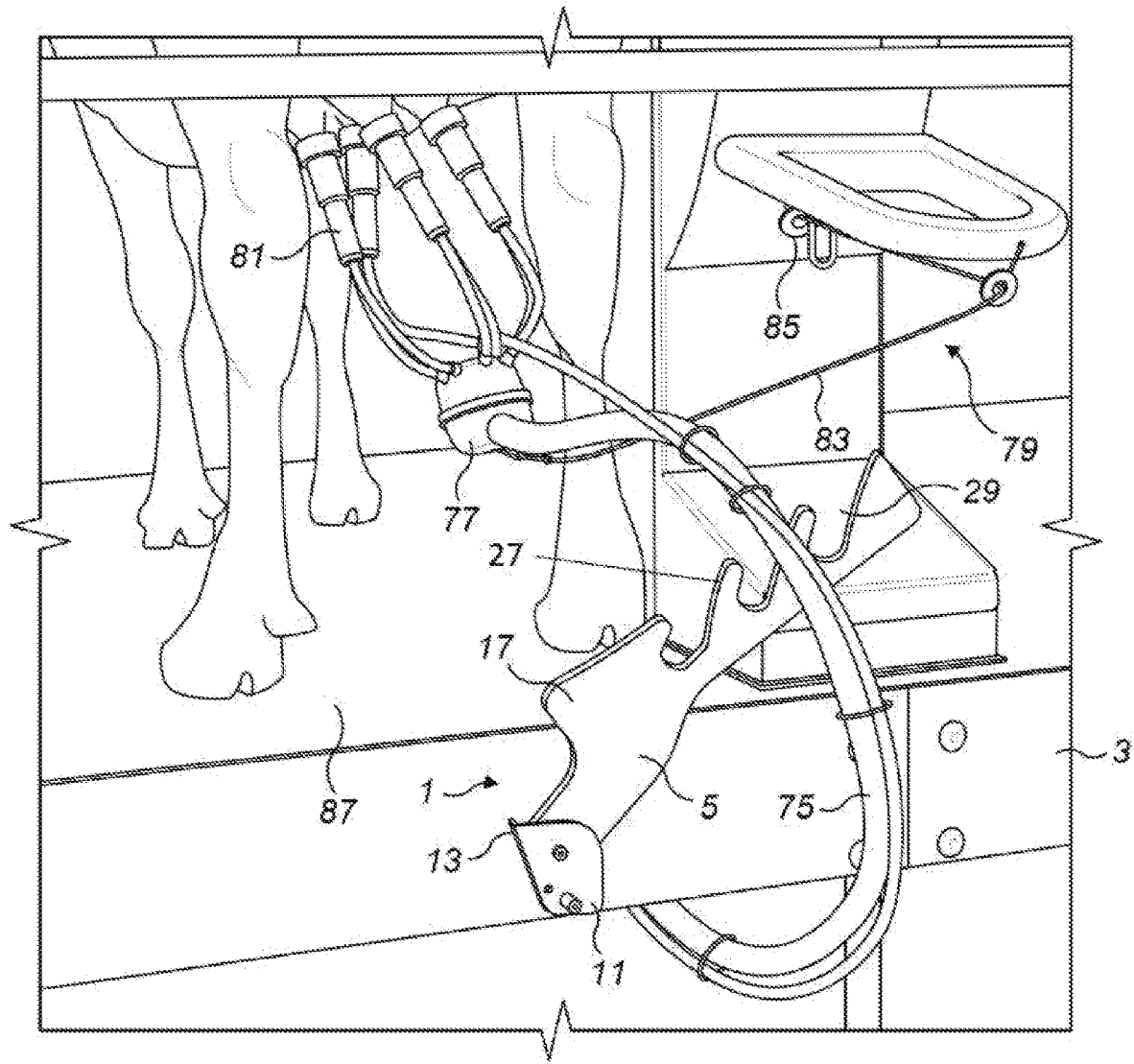
FIG. 12 is a perspective front view of a milking cluster pipe support after a cow has been milked, with the milking cluster being retracted, with the milking cluster pipes no longer located in a pipe slot and with the pipe support arm rotating clockwise under gravity towards the stowed position end stop.
Figure 13:
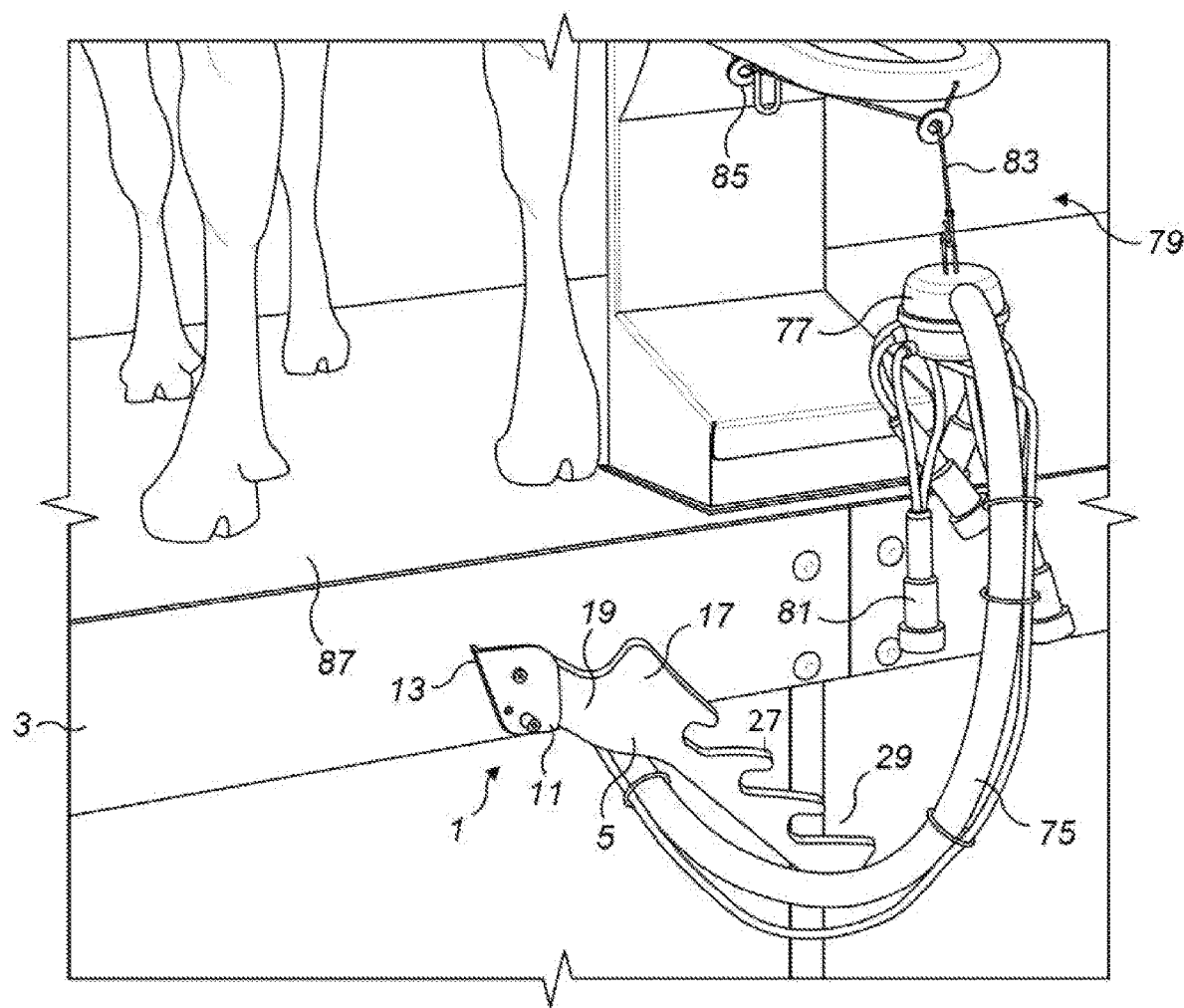
FIG. 13 is a perspective front view of a milking cluster pipe support after a cow has been milked, with the milking cluster fully retracted, with the milking cluster pipes no longer located in a pipe slot and with the pipe support arm resting against the stowed position end stop.

FIGS. 11, 12 and 13 show positions of the pipe support arm 5 after milking has been completed, during retraction of the milking cluster 77 towards the right hand side of the stall 87 and once retraction of the milking cluster 77 has been completed.

FIG. 11 shows the first stage of the retraction phase. The vacuum applied to the teats via the cups 81 is released and the retraction line 83 is drawn into the retraction system 79 by the retractor 85. This starts to pull the milking cluster 77 off the cow's udder. The tension applied to the retraction line 83 acts on the pipe support arm 5 and causes it to rotate in a clockwise direction, away from the deployed position end stop 13 and towards the stowed position end stop 11. The pipe support arm 5 can be caused to move from its deployed position to its stowed position as a result of the retraction cord 83 acting on the pipe support arm 5, by the milking pipes 75 acting on the pipe support arm 5, or by a combination of the retraction cord 83 and the milking pipes 75 acting on the pipe support arm 5. In this first stage, the pipe support arm 5 rotates by more than the balance angle ($\lambda$), but it does not yet fall back to the stowed position, because the milking cluster pipes 75 are still located in the pipe slot 29 and the angle at which the milking cluster pipes 75 are being pulled means that there is still contact between them and at least one of the fingers 27 of the pipe support arm 5.

In the second stage of the retraction phase, as illustrated in FIG. 12, further movement of the milking cluster 11 to the right, under the action of the retraction system 79 causes the milking cluster pipes 75 to be moved into a position whereby the pipe support arm 5 can rotate, under the action of gravity until that rotation is stopped by the pipe support arm 5 coming to rest against the stowed end position stop 11, as shown in FIG. 13.

Once milking has been completed the milked cow leaves the stall and is replaced by an unmilked cow. The cups 81 of the milking cluster 77 are manually placed on the udder of the unmilked cow and the pipe support arm 5 is rotated clockwise from its stowed position to its deployed position, where it rests against the deployed position end stop 13 and is held there by its own weight. The milking cluster pipes 75 are then placed in the one of the pipe slots 29 of the pipe support arm 5 that provides the best support for the milking cluster 77 and, dependent upon the orientation of the support arm 5 (i.e. anti-clockwise, or clockwise, as explained above) and the location of the retraction system 79, the retraction line 83 may or may not be located around the pipe support arm 5. Milking then commences. Once the cow has been milked the milking cluster 77 is removed from the cow's udder as described above and the pipe support arm 5 is once more located in its stowed position.

FIGS. 10, 11, 12 and 13, show use of the present invention in a rotary milking parlour. A cow moves into a stall of the rotary milking parlour by crossing a bridge which links to the rotating platform of the rotary milking parlour. The bridge extends up to the side of the rotary platform and a gap is maintained between the bridge and the rotating platform, that gap is just wide enough to allow the milking cluster pipes 75 to pass through it as the rotating platform rotates past the bridge. During rotation of the rotating platform the cow is milked and by the time the rotating platform has rotated through one revolution the cow has been milked, the milking cluster 77 has been removed and the cow can step off the rotating platform in a backwards direction, on to the bridge and then out of the milking parlour. In leaving the milking parlour a cow will pass across the pipe support arm 5, consequently the pipe support arm 5 needs to be located at or beneath the top of the deck-side 3 when it is in its stowed position (i.e. as shown in FIG. 3). In other types of milking parlours, the cow may not pass across the pipe support arm 5 when leaving the milking parlour and thus there is not necessarily a requirement for the pipe support arm 5 to be located below the top of the deck-side 3 in its stowed position. However, irrespective of the type of milking parlour there is an advantage in locating the pipe support arm 5 below the level of the top of the deck-side 3 when in a stowed position because, when an automatic retraction system 79 is being used, it helps to avoid the milking cluster 77 from catching the pipe support 5 during retraction. When the milking cluster 77 is removed it falls downwards until it nearly reaches the deck of the parlour. If the pipe support arm 5 is held above the level of the deck side 3 it might prevent the milking cluster 77 from being fully retracted with a number of resultant problems including preventing proper cleaning of the cluster and/or the milking cluster 77 coming into contact with the bridge, in the case of a rotary parlour, because the milking cluster 77 is too large to pass through the gap between the bridge and the rotating platform.

Figure 14:
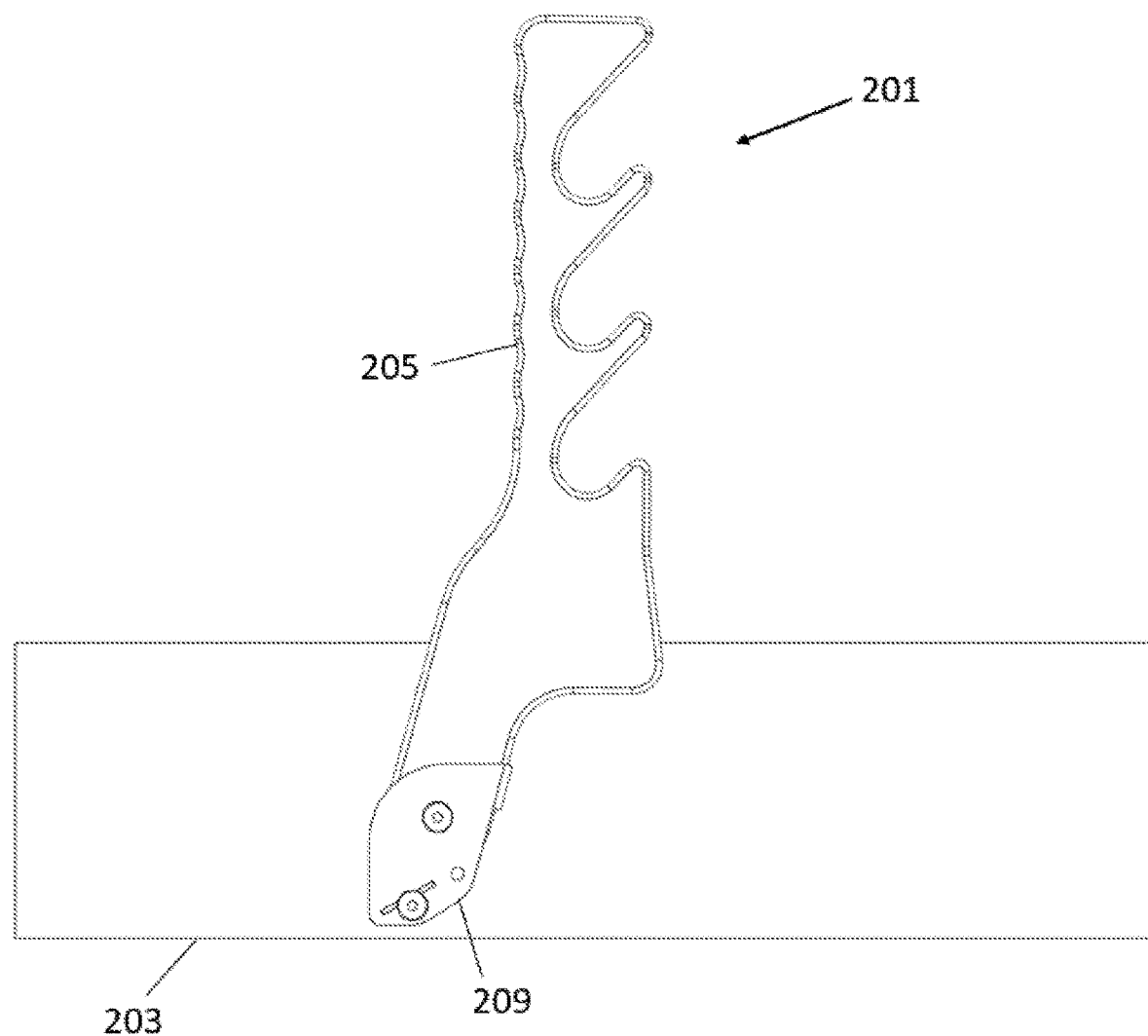
FIG. 14 is a front elevation view of a clockwise milking cluster pipe support according to an embodiment of the present invention fixed to the deck of a milking parlour and with the pipe support arm in a deployed position (the support arm rotates in a clockwise direction when moving from the stowed to the deployed position)

FIG. 14 shows a clockwise milking cluster pipe support 201 according to the present invention fixed to the deck side 203 of a milking parlour. The pipe support arm 205 rotates in a clockwise direction from the stowed position to the deployed position around a pivot bracket 209. A clockwise milking cluster pipe support 201 may be used for a number of practical reasons relating to the layout of the parlour as a whole. For example, as described above, if the retraction system 79 is located on the right hand side of the stall 87 a clockwise milking pipe support 201 can facilitate the retraction of the retraction cord 83 and the milking cluster 77 to move the pipe support arm from its deployed position to its stowed position.

Figure 15:
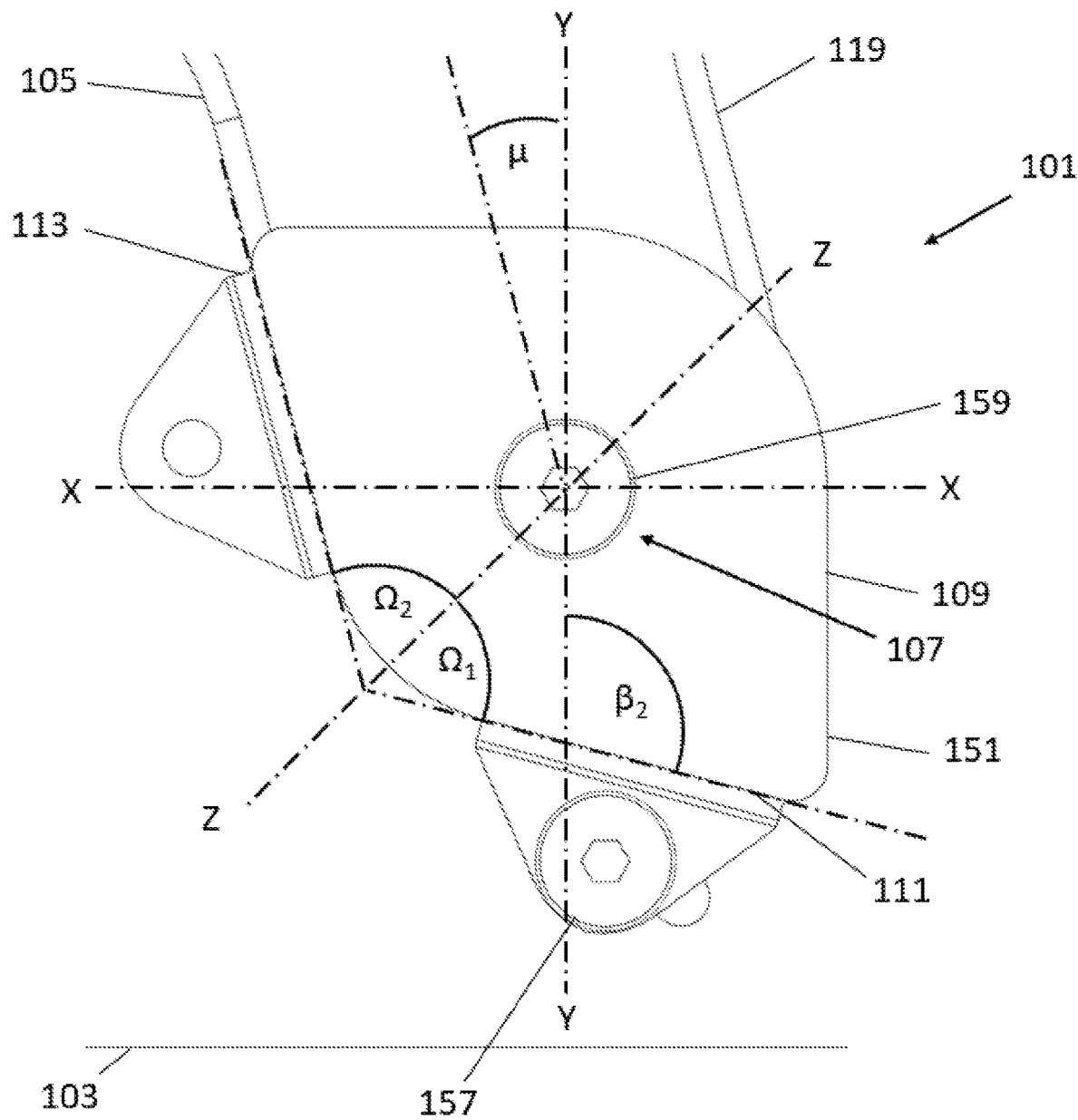
FIG. 15 is a front elevation view of a universal pivot bracket according to a second embodiment of the present invention as part of an anti-clockwise milking cluster pipe support.
Figure 16:
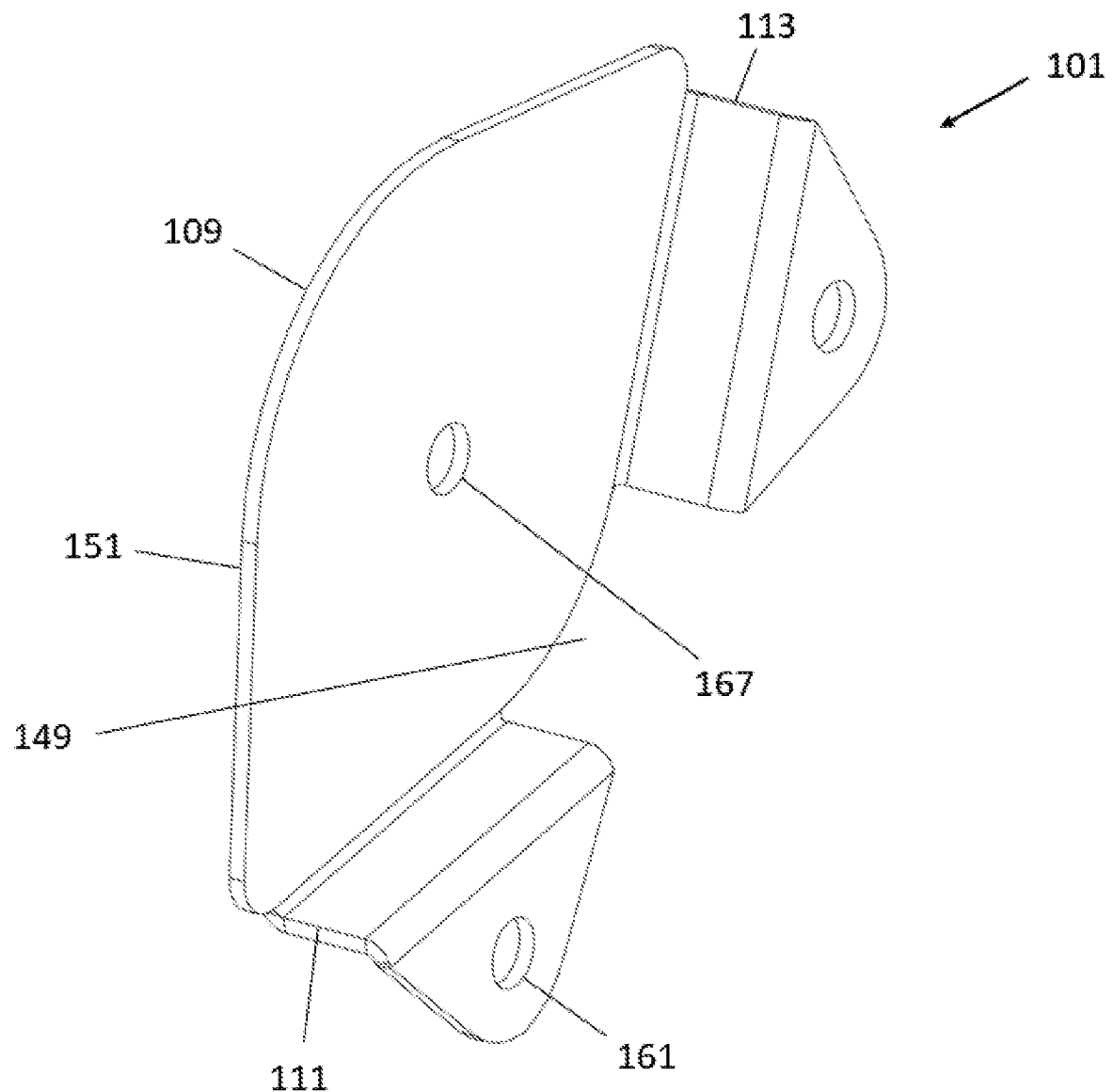
FIG. 16 is a perspective rear view of the universal pivot bracket of FIG. 14.
Figure 17:
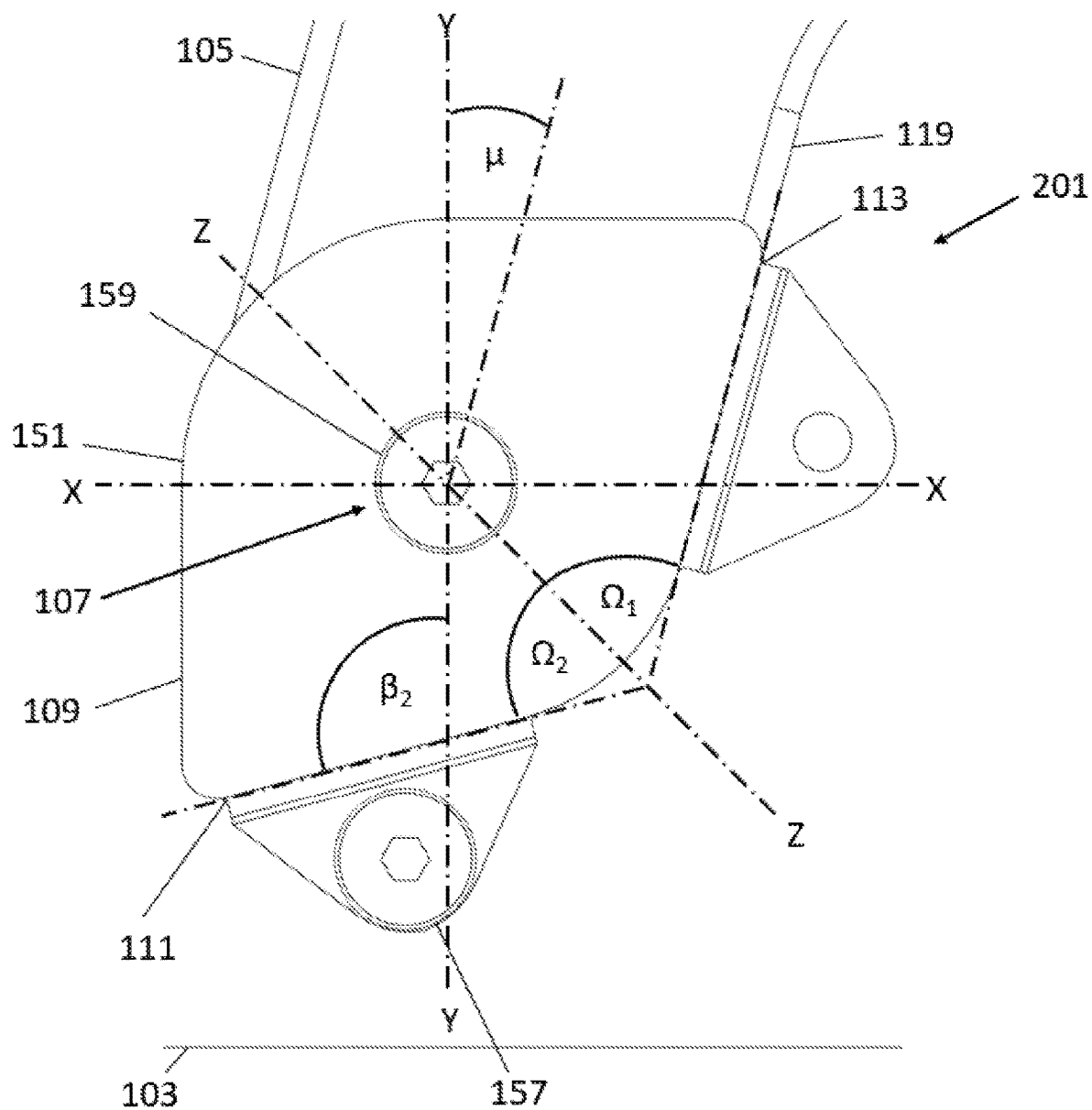
FIG. 17 is a front elevation view of a universal pivot bracket according to the second embodiment of the present invention as part of a clockwise milking cluster pipe support.

FIGS. 15, 16 and 17 show an alternative universal pivot bracket 109 for use in a milking cluster pipe support 101 according to a second aspect of the present invention. The universal pivot bracket 109 can be used with an anti-clockwise milking cluster pipe support 101 (as illustrated in FIG. 14) or a clockwise milking cluster pipe support 201 (as illustrated in FIG. 16).

The universal pivot bracket 109 provides an arm pocket 149 within which the pivot extension 119 of the pipe support arm 105 is located. One side of the arm pocket 149 is provided by a fixings plate 151, the other side is provided by the deck-side 103 and the two sides are kept apart by the stowed position end stop 111 and the deployed position end stop 113. The stowed position end stop 111 and the deployed position end stop 113 are formed integrally with the fixings plate 151 and are arranged perpendicularly to it. The fixings plate 151 is clamped against the deck side 3 by a threaded bottom bolt 157 and a threaded pivot bolt 159. The bottom bolt 157 passes through a first bottom bolt hole 161 (shown in FIG. 15) provided in the fixings plate 151 adjacent to the stowed position end stop 111, through a second bottom bolt hole 163 provided in the deck side 103 and then engages with a threaded bottom nut 165 (not shown) that is adjacent to the back face of the deck side 103. The pivot bolt 159 passes through a first pivot bolt hole 167, provided in the fixings plate 151 between the stowed position end stop 111 and the deployed position end stop 113, through a cylindrical pivot bush 169 that is provided within the pivot bore 147 of the pipe support arm 105, through a second pivot bolt hole 171 provided in the deck side 103 and then engages with a threaded pivot nut 173 (not shown) that is adjacent to the back face of the deck side 103. The bottom bolt 157 and the pivot bolt 159 are tightened so that the stowed position end stop 111, the deployed position end stop 113 and the pivot bush 169 are held in contact with the deck side 103. The pivot bush 169 is held against rotation by the clamping force and the pipe support arm 105 rotates around the pivot bush 169 because the internal diameter of the pivot bore 147 is slightly larger than the external diameter of the pivot bush 169.

FIG. 15 illustrates the angles at which the stowed position end stop 111 and the deployed position end stop 113 are oriented relative to the pivot 107 of the pipe support arm 105. The stowed position angle ($\beta_2$) is 105 degrees from the vertical in a clockwise direction and the deployed position angle ($\mu$) is 15 degrees from the vertical in an anti-clockwise direction. The pivot bracket 109 has an axis of symmetry Z-Z and the stowed position end stop 111 is offset from axis Z-Z by an angle ($\Omega_1$) of 60 degrees and the deployed position end stop 113 is offset from axis Z-Z by an angle ($\Omega_2$) of 60 degrees. Angles $\Omega_1$ and $\Omega_2$ are the same so that the universal pivot bracket 109 can be used for both anti-clockwise and clockwise milking cluster pipe supports 101, 201.

Figure 18:
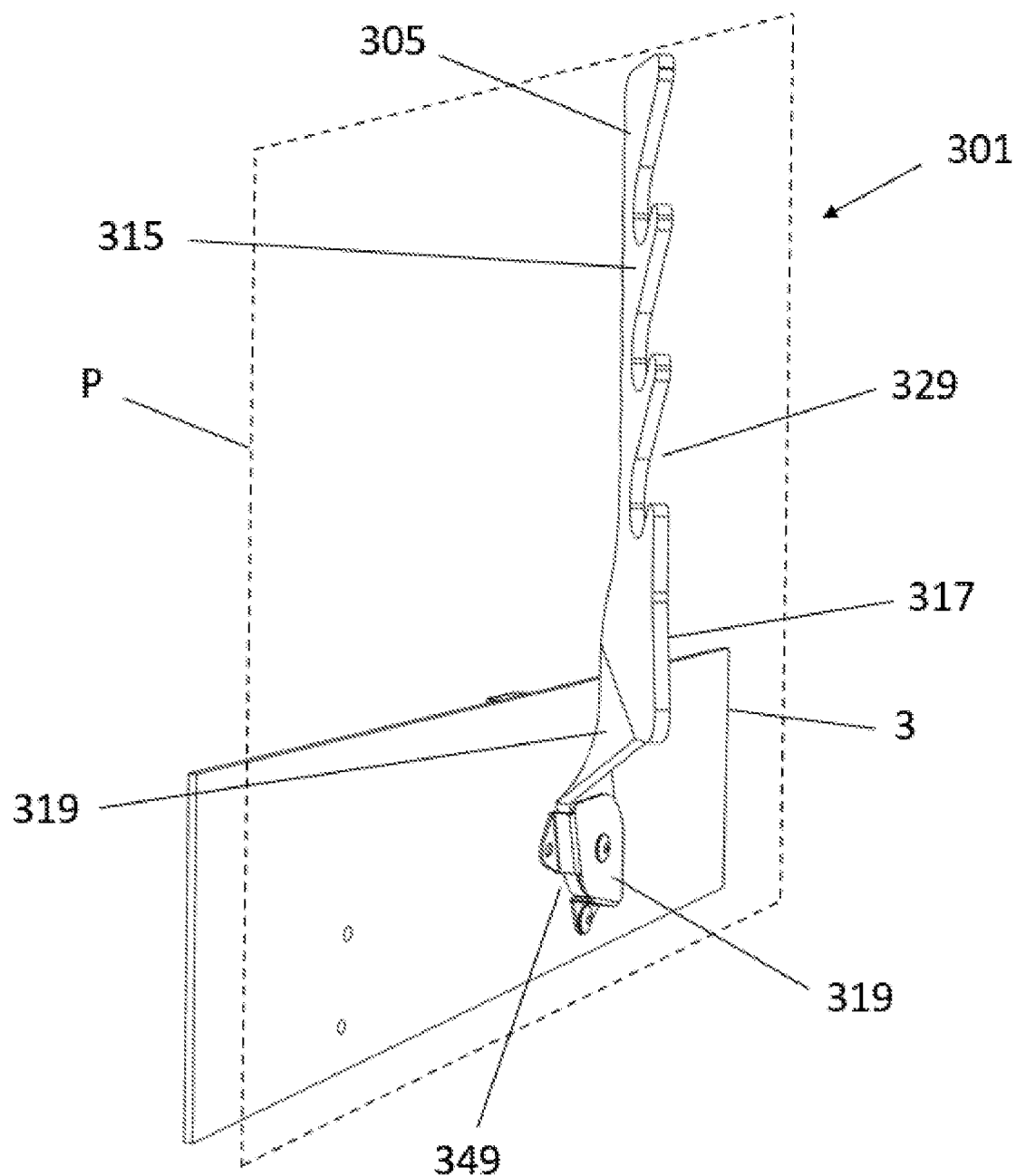
FIG. 18 is a perspective elevation view of an anti-clockwise milking cluster pipe support according to a third embodiment of the present invention in which the pipe support arm is rotated out of plane P.

FIG. 18 illustrates a third embodiment of the present invention in which a pipe support arm 305 of a milking cluster pipe support 301 has a portion that is twisted out of plane P and away from a deck-side 3 of the milking parlour. Other than the twist applied to the pipe support arm 305 it has the same features as the pipe support arm 5 of the first embodiment of the invention, including, for example, at least one pipe slot 329. The pipe support arm 305 is connected to the deck-side 3 of the milking parlour using a universal pivot bracket 109, as described above and illustrated in FIGS. 15, 16 and 17. The twist is provided in the upper part of the pivot extension 319. The lower part of the pivot extension 319 is located within the plane P, such that it can pass through the arm pocket 349 when moving from the deployed position to the stowed position. The slotted body 315 is flat and planar, along with most of the counterweight section 317.

Figure 19:
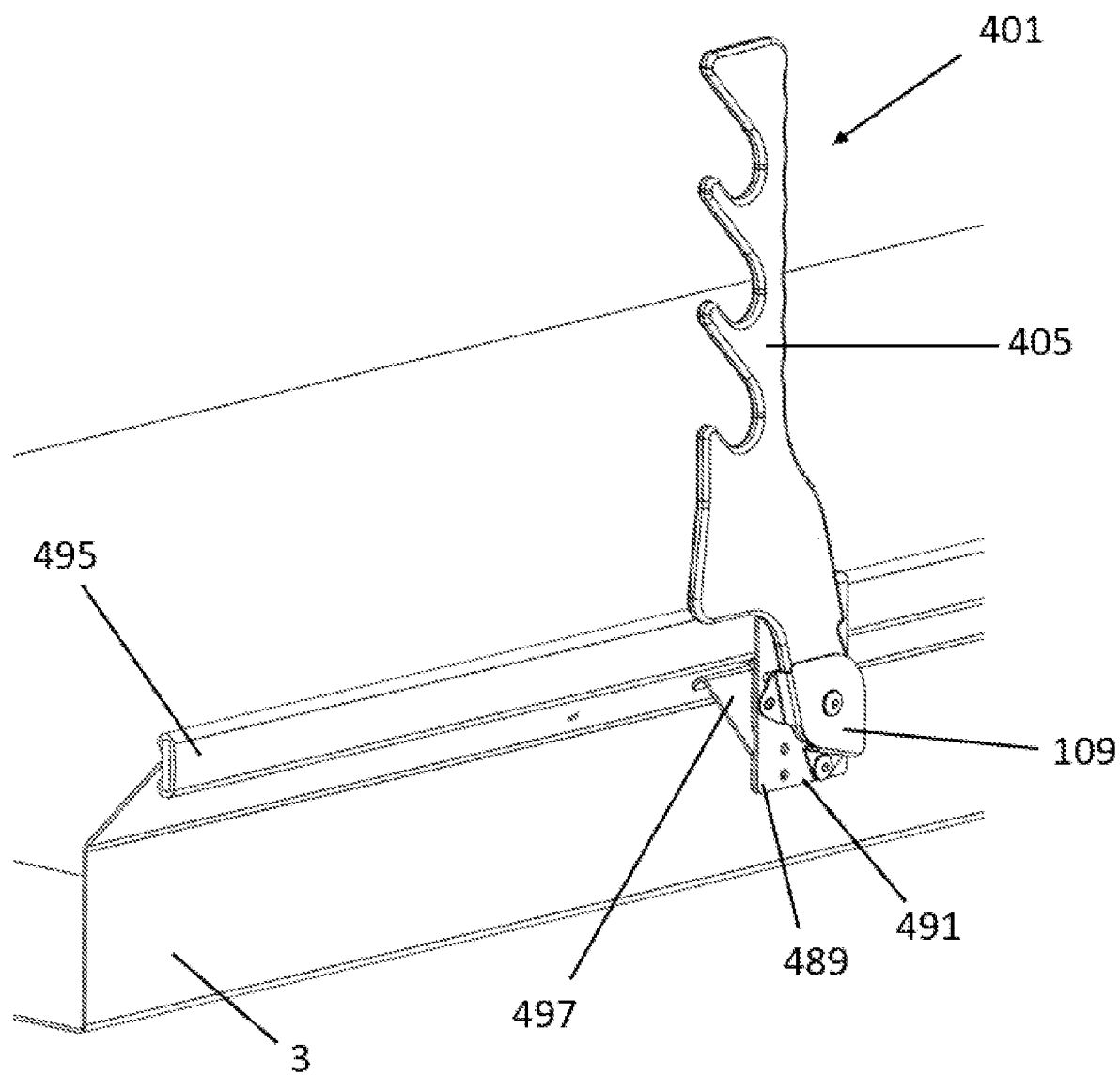
FIG. 19 is a perspective elevation view of an anti-clockwise milking cluster pipe support according to a fourth embodiment of the present invention with a mounting plate for attaching the milking cluster pipe support to the deck-side or kerb of a first type of rapid exit milking parlour.
Figure 20:
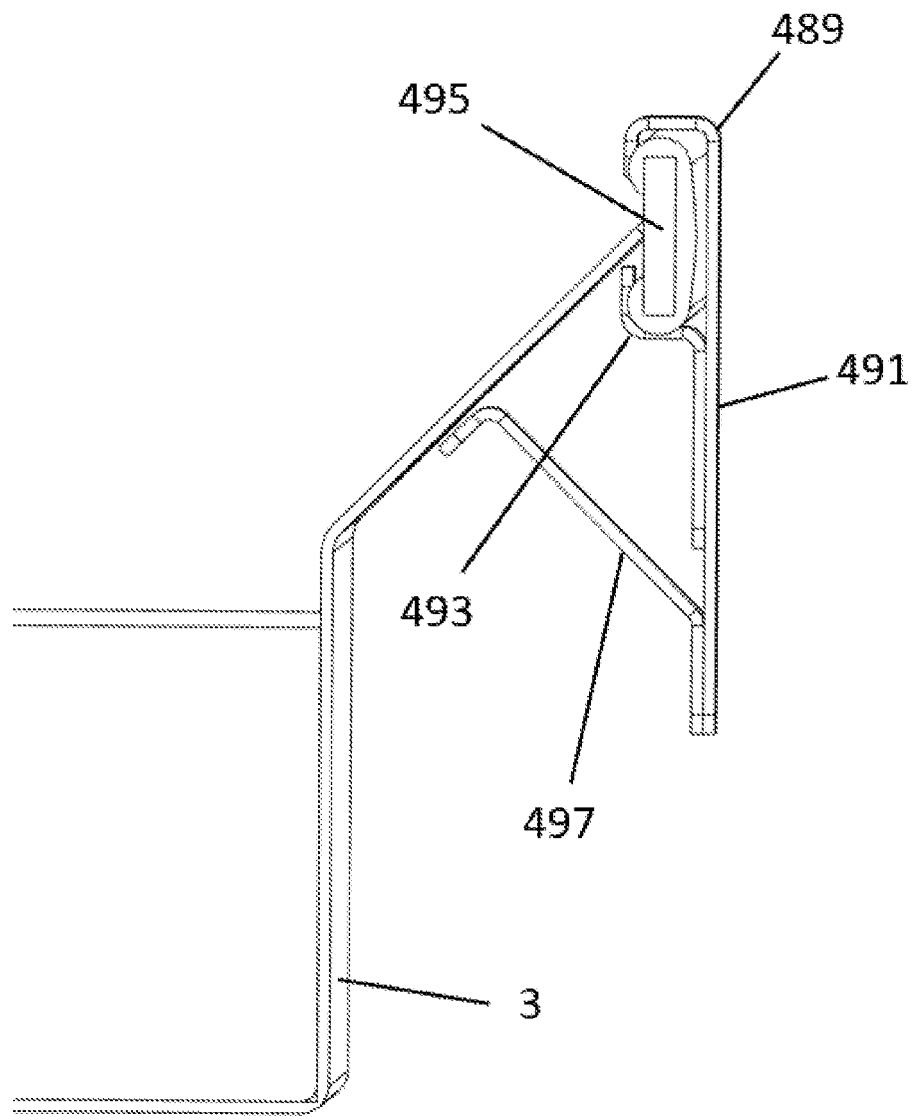
FIG. 20 is an end view of the mounting plate of the fourth embodiment of the present invention as shown in FIG. 19.

FIG. 19 illustrates a fourth embodiment of the present invention in which a milking cluster pipe support 401 is attached to the deck-side 3 of a rapid exit milking parlour using a mounting plate 489. The pipe support arm 405 has the same features has the pipe support arm 5 of the first embodiment of the present invention and is attached to the mounting plate 489 using a universal pivot bracket 109, as described above and illustrated in FIGS. 15, 16 and 17. The mounting plate 489 comprises a vertically oriented flat attachment surface 491 provided with mounting holes to which the universal pivot bracket 109 can be attached using mechanical fixings (not shown). As best shown in FIG. 20, the top edge of the attachment surface 491 is bent over to form a hook shaped profile in cross-section. A retention member 493 is attached to the back of the attachment surface 491 in order to create a void within which a vertically orientated rail 495 of the deck-side 3 can fit. A bracing arm 497 is also attached to the back of the attachment surface 491 in order to brace the mounting plate 489 against the deck-side 3, so that the attachment surface 491 remains vertically orientated. The mounting plate 489 can slide along the rail 495, so that the lateral position of the milking cluster pipe support 401 within the stall 87 can be adjusted. Additionally, or alternatively, the milking cluster pipe support 401 can be permanently fixed in one position on the deck-side 3.

FIG. 21 illustrates a fifth embodiment of the present invention in which a milking cluster pipe support 501 is attached to the deck-side 3 of a herringbone milking parlour using a mounting plate 589. The mounting plate 589 has the same features as the mounting plate 489 of the first embodiment, except that the configuration of the hook shaped profile and the retention member 593 are different in order to accommodate the rail 595 which is tilted at an angle to the vertical. The mounting plate 589 can slide along the rail 595, so that the lateral position of the milking cluster pipe support 501 within the stall 87 can be adjusted. Additionally, or alternatively, the milking cluster pipe support 501 can be permanently fixed in one position on the deck-side 3.

FIG. 22 illustrates a sixth embodiment of the present invention in which a milking cluster pipe support 601 is attached to the deck-side 3 of a rapid exit milking parlour using a mounting plate 689. The pipe support arm 605 has the same features has the pipe support arm 5 of the first embodiment of the present invention and is attached to the mounting plate 689 using a universal pivot bracket 109, as described above and illustrated in FIGS. 15, 16 and 17. The mounting plate 689 comprises a vertically oriented flat attachment surface 691 provided with mounting holes to which the universal pivot bracket 109 can be attached using mechanical fixings (not shown). The top edge of the attachment surface 691 is bent over to form a hook shaped profile in cross-section and the bottom edge of the attachment surface is bent through 90 degrees in the same direction to create a stand-off from the deck-side 3 that retains the flat attachment surface 691 in a vertical orientation. The mounting plate 689 can slide along the rail 695, so that the lateral position of the milking cluster pipe support 601 within the stall 87 can be adjusted. Additionally, or alternatively, the milking cluster pipe support 601 can be permanently fixed in one position on the deck-side 3.

The invention claimed is:

1. A milking cluster pipe support, for fitment to a deck-side or kerb of a milking parlour, comprising a pivotable pipe support arm that moves within a plane P between a deployed position and a stowed position, wherein:
the extent of movement of the pipe support arm is limited to between the deployed position and the stowed position and is constrained by a deployed position end stop and by a stowed position end stop and in the deployed position the pipe support arm rests against the deployed position end stop and in the stowed position the pipe support arm rests against the stowed position end stop, the pipe support arm having towards one end at least one open ended pipe slot and having towards another end a pivot point;

the milking cluster pipe support has a pivot extending perpendicularly to the plane P and having a horizontal axis X-X and a vertical axis Y-Y located within the plane P and passing through the centre of the pivot;

the pipe support arm comprises a counterweight section and the pipe support arm further comprises a slotted body and a pivot extension that are each attached to the counterweight section, wherein the slotted body has a spine with a longitudinal axis L-L that is vertically oriented when the pipe support arm is in a vertical position and the pivot extension is offset from the longitudinal axis L-L by an angle « in a second rotational sense;

the pipe support arm pivots freely around the pivot within the plane P and moves in a first rotational sense from its deployed position to its stowed position and in the second rotational sense from its stowed position to its deployed position, wherein the first rotational sense and the second rotational sense are opposite to each other;

when the pipe support arm is located in the deployed position, a centre of gravity of the pipe support arm is located on one side of the vertical axis Y-Y and the pipe support arm is held against the deployed position end stop under the action of gravity and when the pipe support arm is located in the stowed position, the centre of gravity of the pipe support arm is located on the other side of the vertical axis Y-Y and the pipe support arm is held against the stowed position end stop under the action of gravity;

the counterweight section is located on the same side of the vertical axis Y-Y as the deployed position end stop when the pipe support arm is located in the deployed position and is located on the other side of the vertical axis Y-Y when the pipe support arm is located in the stowed position; and wherein the centre of gravity of the pipe support arm crosses the vertical axis Y-Y during movement between the stowed position and the deployed position.

2. A milking cluster pipe support as claimed in claim 1, wherein, in use, when the pipe support arm is in the deployed position the at least one open ended pipe slot is located above a level of a top of the deck-side or kerb to which the milking cluster pipe support is fitted and when, in use, the pipe support arm is in the stowed position and the at least one open ended pipe slot is located below the level of the top of the deck-side or kerb to which the milking cluster pipe support is fitted.

3. A milking cluster pipe support as claimed in claim 1, wherein the deployed position end stop is located on the plane P and the stowed position end stop is located on the plane P.

4. A milking cluster pipe support as claimed in claim 1, wherein the deployed position end stop is located on the same side of the vertical axis Y-Y as the centre of gravity of the pipe support arm when the pipe support arm is in the deployed position, and wherein the stowed position end stop is located on the same side of the vertical axis Y-Y as the centre of gravity of the pipe support arm when the pipe support arm is in the stowed position.

5. A milking cluster pipe support as claimed in claim 1, wherein the pivot, the deployed position end stop, and the stowed position end stop are provided on a pivot bracket.

6. A milking cluster pipe support as claimed in claim 5, wherein the pipe support arm and the pivot bracket are reversible and in a first orientation the first rotational sense is clockwise and in a second orientation the first rotational sense is anti-clockwise.

7. A milking cluster pipe support as claimed in claim 1, wherein when the pipe support arm is in the stowed position the at least one open ended pipe slot is located below the horizontal axis X-X.

8. A milking cluster pipe support as claimed in claim 1, wherein the pipe support arm comprises a spine from which extends the at least one open ended pipe slot, the spine having a longitudinal axis L-L which is oriented vertically when the pipe support arm is in the deployed position and the at least one open ended pipe slot being directed upwards at an acute angle $\Theta$ relative to the longitudinal axis L-L.

9. A milking cluster pipe support as claimed in claim 8, wherein the acute angle $\Theta$ is 43 degrees.

10. A milking cluster pipe support as claimed in claim 1, wherein the at least one open ended pipe slot has a mouth located at its open end and a base at its other end and wherein the mouth is located in the direction of the second rotational sense relative to the base.

11. A milking cluster pipe support as claimed in claim 1, wherein the angle $\alpha$ is 15 degrees.

12. A milking cluster pipe support as claimed in claim 1, having three pipe slots, wherein each pipe slot is provided between a pair of fingers extending from the spine of the pipe support arm.

13. A milking cluster pipe support as claimed in claim 1, wherein the pivot comprises a pivot hole in the pipe support arm located at the pivot point and a pivot pin, wherein the pivot hole is in the form of a pivot bore and wherein the internal diameter of the pivot bore has a diameter larger than a clearance diameter relative to the external diameter of the pivot pin, such that movement of the pipe support arm outside of the plane P is facilitated.

14. A milking cluster pipe support as claimed in claim 1, wherein the stowed position end stop is rotationally offset around the pivot from the axis Y-Y in the first rotational sense by an angle $\beta_1$, $\beta_2$ of 105 degrees.

15. A milking cluster pipe support as claimed in claim 1, wherein the deployed position end stop is rotationally offset around the pivot from the axis Y-Y in the second rotational sense by an angle $\alpha$, $\mu$ of 15 degrees.

16. A milking cluster pipe support as claimed in claim 1, wherein the pipe support arm has a front face and a back face through each of which the at least one open ended pipe slot passes, wherein the pivot is located perpendicularly to the front face and to the back face and the front face and the back face are parallel to the plane P.

17. A milking cluster pipe support as claimed in claim 1, in which the pipe support arm has a front face and a back face through each of which the at least one open ended pipe slot passes, wherein the front face and the back face are located at an angle to the plane P.

18. A milking cluster pipe support as claimed in claim 1, in which the pipe support arm has a front face and a back face through each of which the at least one open ended pipe slot passes, wherein at least a portion of the front face and the back face are located at an angle to the plane P.

19. A milking cluster pipe support as claimed in claim 1, further comprising a mounting plate to which the pivot is attached, wherein the mounting plate has a vertically orientated attachment surface and the mounting plate is attachable to the deck-side.

20. A milking cluster pipe support as claimed in claim 19, wherein the mounting plate is slideably attachable to the deck-side.

21. A milking parlour comprising a deck-side or a kerb to which is fitted a milking cluster pipe support according to claim 1.

* * * * *